US006543578B1

(12) United States Patent
Merz

(10) Patent No.: US 6,543,578 B1
(45) Date of Patent: *Apr. 8, 2003

(54) ANALOG CONTROL

(75) Inventor: Ernest J. Merz, Waynesboro, PA (US)

(73) Assignee: Safety Dynamicon, Inc., Waynesboro, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/664,233

(22) Filed: Sep. 18, 2000

Related U.S. Application Data

(63) Continuation-in-part of application No. 08/672,427, filed on Jun. 28, 1996, now Pat. No. 6,170,606.

(51) Int. Cl.$^7$ .................................................. E04G 8/00
(52) U.S. Cl. ........................ 182/2.11; 182/2.2; 182/148
(58) Field of Search ............................. 182/2.1, 2.11, 182/2.2, 2.3, 2.7, 2.8, 2.9, 148; 341/20

(56) References Cited

U.S. PATENT DOCUMENTS

| | | | |
|---|---|---|---|
| 2,627,560 A | | 2/1953 | Eitel .............................. 200/5 |
| 3,723,687 A | * | 3/1973 | Adkinson .................... 200/157 |
| 4,160,492 A | * | 7/1979 | Johnston ........................ 182/2 |
| 4,456,093 A | * | 6/1984 | Finley et al. ................... 182/2 |
| 5,107,955 A | * | 4/1992 | Kishi .............................. 182/2 |
| 5,832,305 A | * | 11/1998 | Briggs et al. ................ 395/871 |
| 5,880,684 A | * | 3/1999 | Diekhans ...................... 341/20 |
| 5,880,956 A | * | 3/1999 | Graf ............................ 364/191 |
| 6,002,351 A | * | 12/1999 | Takeda et al. ................. 341/20 |
| 6,170,606 B1 | * | 1/2001 | Merz .......................... 182/2.1 |

FOREIGN PATENT DOCUMENTS

| | | |
|---|---|---|
| WO | WO 98/00618 | 1/1998 |
| WO | WO 00/36250 | 6/2000 |

* cited by examiner

*Primary Examiner*—Bruce A. Lev
(74) *Attorney, Agent, or Firm*—Woodcock Washburn LLP

(57) ABSTRACT

A control system for three mechanisms of a machine may include a pair of pivotable or rotatable structures and a telescoping or longitudinally urgeable structure that are coupled to a single handgrip and contained within a single structure. The control structures may simulate corresponding structures of an aerial platform on which they may be mounted, and provide motions in the same directions of the corresponding structures. Switches are activated upon urging of a handgrip, and springs may be provided to return the control to its neutral position. An aerial platform, a crane, or any other mobile machine may employ the control device and include corresponding structure.

54 Claims, 8 Drawing Sheets

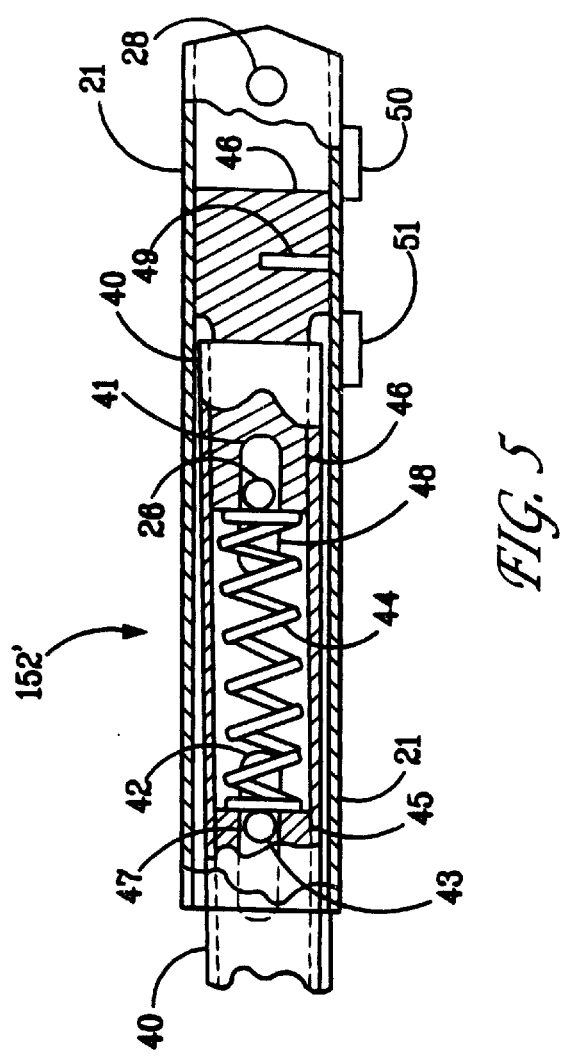
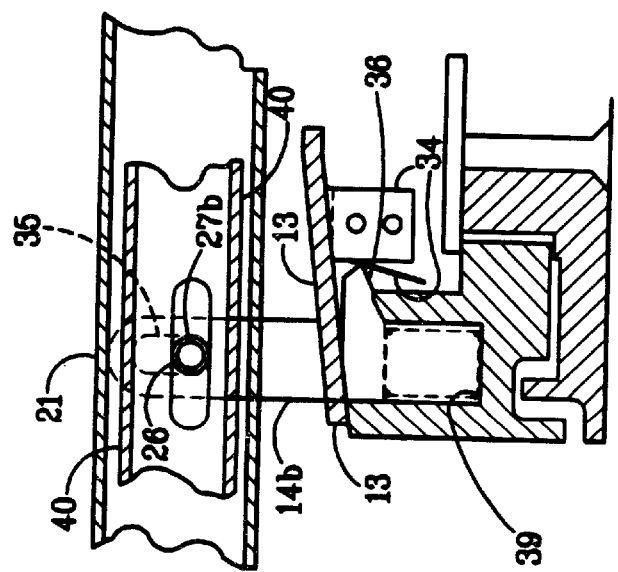
FIG. 5
FIG. 4

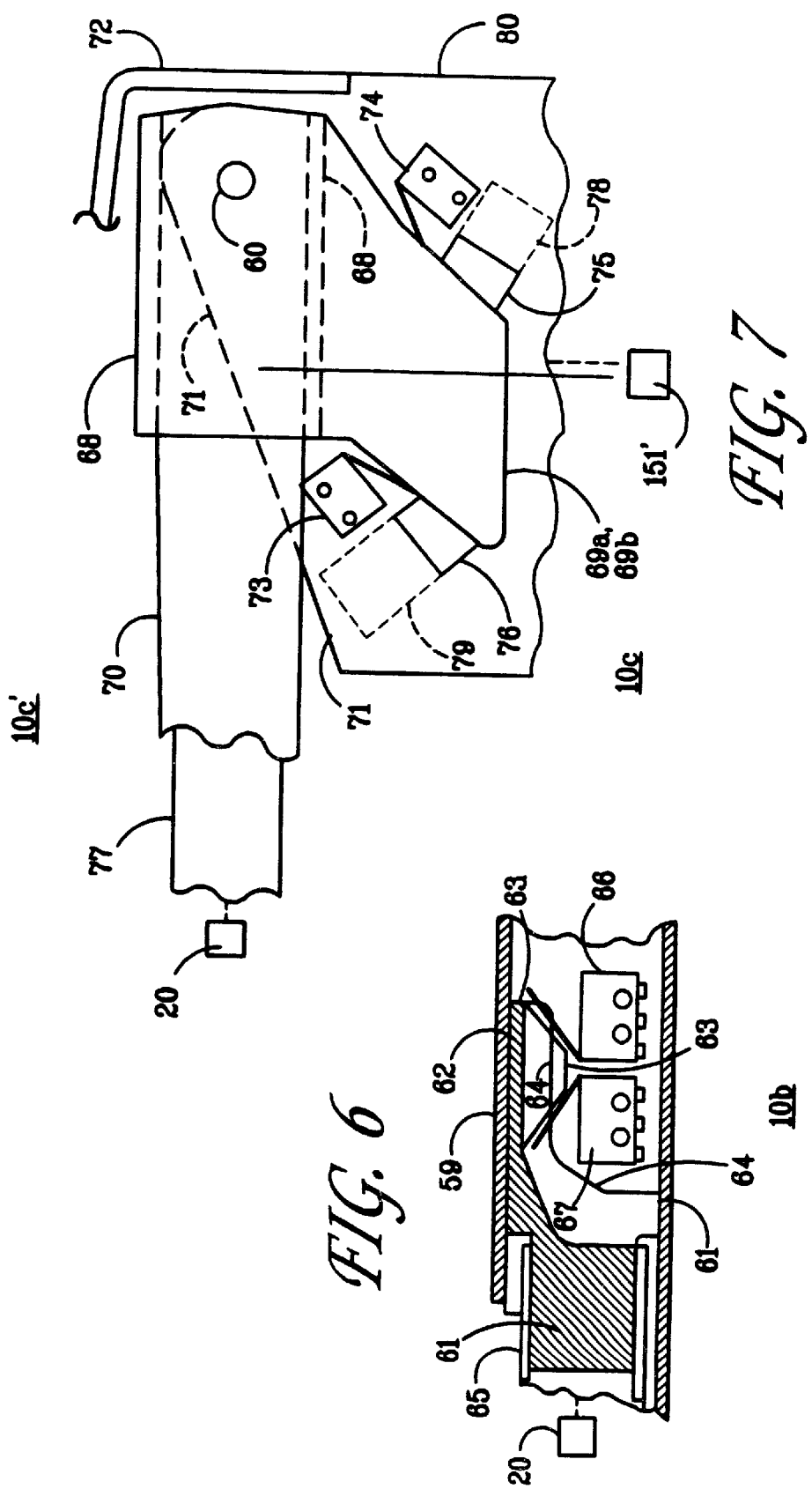

ANALOG CONTROL

This is a continuation-in-part of application Ser. No. 08/672,427, filed Jun. 28, 1996, now U.S. Pat. No. 6,170,606.

FIELD OF THE INVENTION

This invention relates to analog controls, and, more particularly, to controls for facilitating movement of work platforms and the like.

BACKGROUND OF THE INVENTION

Aerial work platforms have been developed and in use for more than twenty five years. Their primary purpose is to raise workers quickly and safely to positions to do necessary work. They replace earlier means of access such as ladders and scaffolds. Some models can also reach below a surface or a long horizontal distance from the surface on which they are located, and some types of lifts can place workers as high as 150 to 250 feet above the ground.

Three types make up the major population of such machines:
1. Vehicle-Mounted Elevating and Rotating Aerial Devices as covered by ANSI/SIA A92.2—1990. These machines are typically mounted on a commercial truck chassis but may be mounted on a trailer chassis and are used in erection and maintenance of utility lines. They include models where the work platform is supported by an articulating or a telescoping boom which is mounted on a turntable that can rotate about an axis.
2. Boom-Supported Elevating Work Platforms as defined in ANSI/SIA A92.5—1992. These machines are self-propelled, typically have a telescoping and/or articulating boom and are used in construction and maintenance tasks.
3. Self-Propelled Elevating Work Platforms as defined in ANSI/SIA A92.6—1990. These machines (typically scissor-lifts) elevate the work platform vertically but do not position the platform horizontally completely outside the base on which it is supported. They are also used in general construction and maintenance tasks.
4. Other aerial work platforms on which the analog control maybe utilized include: Manually Propelled Elevating Work Platforms as defined in ANSI/SIA A92.3—1990. These machines are manually propelled and have platforms that cannot be positioned completely outside the base.
5. Airline Ground Support Vehicle-Mounted Vertical Lift Devices as defined in ANSI/SIA A92.7—1990. These are machines designed specifically for aircraft servicing and maintenance.
6. Vehicle-Mounted Bridge Inspection and Maintenance Devices as defined in ANSI/SIA A92.8—1993. These machines are designed to reach out, down and under a bridge for inspection and maintenance.
7. Mast-Climbing Work Platforms as defined in ANSI/SIA A92.9—1993. These machines are designed to place several workers on a platform along a wall or similar vertical surface to do extensive operations.

Controls for operating most of the types of aerial platforms mentioned above are comprised of electrical switches or other devices mounted at an operator's station on the platform. These electrical devices control valves or other means on the chassis which in turn activate hydraulic or electrically powered devices such as cylinders or motors. Mechanical controls are difficult or impossible to use for controls on the platform because of the distance from the platform to the chassis and the mechanical positioning of the platform relative to the chassis in order to reach the desired work location. Likewise, it is difficult and inefficient, except in the simplest machines, to route multiple hydraulic lines with hoses at mechanical joints up to the platform where hydraulic valves could be used to control machine motions. Therefore, the industry practice has evolved to the use of electrical switches and controllers on the platform which actuate hydraulic or electrical means on the chassis to cause the desired motion.

Two general types of electrical devices are (1) the simple on/off switch that may be actuated in two directions, e.g., up or down, and usually is spring loaded to return to neutral, and (2) the controller type of switch that usually provides an electrical output signal proportional to the displacement of the handle of the controller. The proportional controller is important to the operator and is used to make smooth starts and stops and to move at a reduced rate of speed as existing conditions may make desirable. Proportional controllers are used on most sophisticated aerial work platforms and on those providing greater platform height. The two types are used interchangeably in this document and it will be understood that the word "switch" is to be interpreted broadly and includes a controller, and vice versa.

Switches were typically located on the operator's control panel in patterns which may have been influenced by aesthetics, space considerations and fabrication economy. Beginning in 1980, the applicable consensus standard for boom-supported elevating platforms (ANSI A92.5—1980) specified that "all directional controls shall move in the direction of the function which they control when possible, and shall be of the type which return to the 'off' or the neutral position when released. Such controls shall be protected against inadvertent operation." Directional controls are defined in the ANSI A92.5—1980 Standard as "all controls necessary to raise, lower, rotate, telescope, drive or otherwise initiate the powered functions of the work platform." A similar requirement had first appeared in the ANSI A92.6—1979 Standard on Self-propelled Elevating Work Platforms, albeit without the definition of "directional controls."

One design with clear advantages with respect to earlier control arrangements is disclosed and described in U.S. Pat. No. 4,331,215—Grove et al. This patent discloses controls that are individual electric devices mounted on a surface slightly inclined to the vertical or on a second surface slightly inclined to the horizontal. This arrangement permits all of the controls to operate in substantially the same direction in which the platform moves as a result of the control activation. This design meets the requirement of the applicable consensus standard (ANSI A92.5—1992) and provides an approach that minimizes operator error, a major cause of accidents on aerial work platforms.

As noted in the Grove et al. Patent, workers such as electricians, painters, sandblasting operators, bricklayers and carpenters using these machines are skilled primarily in the area of their work specialty and the aerial platform they are using serves solely as a positioning means, hence, many operators do not become as proficient as the trained operators of cranes or earth-moving machinery who do nothing but operate such machines full time. Moreover, operators of aerial platforms may use one machine for a few days and may then be assigned a different make and model that has a different control arrangement, or may even rent different machines for use on an "as needed" basis. Although operators of aerial platforms are required to be trained, such training may be limited and often does not include specific training on the control variations used on different makes and models. Therefore, the opportunity for inadvertent errors is increased by the requirement for the operator to first select the proper control, second, to check to be certain of which way to operate the control handle, and third, to then implement the control operation.

Other machines utilize controls which differ from the typical steering wheel, accelerators brake, and gear shift with which most people are familiar. Various construction vehicles such as skid-steer loaders, bulldozers, and front end loaders are provided with control levers usually based on the mechanical devices which effect the motion but often do not move in a direction of the motion caused nor do they provide a simulated model of the machine for quick operator recognition and orientation. Certain models of power lawn mowers currently available also utilize levers to effect driving and steering but lack the analogous motion and the simulated model of the machine for quick operator recognition and orientation. Another control layout which was developed on early aircraft and is still used on certain light aircraft and military fighters is the pilot's cockpit control stick. When the control stick is pushed to the left, the aircraft rolls to the left in response; when the stick is pushed forward, the aircraft rotates nose downward in response. However, the control stick does not provide the third axis control for the rudder, and, most importantly, does not provide the simulated model which ensures the quick recognition and orientation needed for aerial platform operators. Pilots are required to be trained and licensed, even for light civilian aircraft, while military aircraft can only be flown by pilots who have hundreds of hours of training and flight experience. On the other hand, training of aerial platform operators is often minimal; indeed, a worker at a large construction site will often come upon an aerial platform not in use, will start it if possible, and will proceed to use it without permission or any training.

Further requirements for the operator's controls are specified in the ANSI/SIA A92.6—1990 Standard for Self-propelled Elevating Work Platforms that require that the upper controls (on the platform) shall "include a control which shall be continuously activated in order for upper directional controls to be operational and which automatically returns to the off position when released." A similar requirement is specified in the ANSI/SIA A92.5—1992 Standard for Boom-Supported Elevating Work Platforms by specifying that the upper controls provided at the platform shall "include a separate safety control which shall be continuously activated for upper directional controls to be operational, and which renders upper directional controls inoperative when released." These requirements have typically been met by having a separate foot pedal or an equivalent switch that must be operated by the operator in order for the directional controls to be used. A foot pedal can be actuated by the operator while using one hand to operate the directional control. However, in addition to the cost and installation expense, the foot pedal requires an electrical cord connection which must be durable, and together with the pedal is subject to rough service, deterioration due to weather conditions and damage from falling objects. A separate hand switch may be utilized but the operator may then be required to use both hands. A safety control may be integrated into each directional control but this would require three or more duplicate safety switches, with the controls of each capable of being released by the operator if he or his hand is trapped such that he cannot return the directional control to neutral.

In general, a safety control, in order to be most effective and provide maximum safety enhancement, must meet at least the following requirements:

1. It must prevent inadvertent operation of a directional control in case the directional control is struck by the operator, by other personnel or by a falling object or tool being used in performance of a work task;
2. When released it would preferably provide a signal to stop all powered functions if a malfunction occurs in the directional control or any other component of the control system;
3. When released it would preferably provide a signal to stop all powered functions if a malfunction occurs in any component of the power supply system; and
4. It would preferably provide a signal to stop or prevent unsafe powered motion that may be caused by a single point failure mode, which is an event caused by malfunction of a single component. It is to be avoided in aerial work platforms because of the potentially dangerous motion of the platform where the operator is located.

Thus, despite the advances made in the art, the control systems and arrangements discussed above are deficient in not providing a total human factors solution and in not utilizing a control configuration and mechanism that can provide rapid and certain recognition and orientation to both trained and untrained operators, resulting in increased safety and operator efficiency.

SUMMARY

A control system is provided that may enhance recognition by the operator in that portions of the control system correspond to portions of the mobile machine that is to be controlled and that may enhance comprehension by the operator in that movement of portions of the control system produce like movements in the corresponding mobile machine portions. The control system may be designed according to the following guidelines. First, the mechanisms of the control may be approximately parallel to those of the overall machine. Second, the motions of the control may cause motions of the machine mechanisms in the same direction that the control is moved. Third, the operator can observe the motions of the control and visually verify that the machine is responding with the intended motion. Any or all of these principles may be employed by the control systems disclosed herein.

According to the present invention, a control system for providing signals in response to an operator's input is provided. The control system includes a fixed base, a handgrip, a first pivotable portion, a second pivotable portion, and a telescoping portion. The first pivotable portion is pivotable about a substantially vertical axis, the second pivotable portion is pivotable about a substantially horizontal axis. The second pivotable is coupled to the first pivotable portion. The translating portion is slideable along an axis that is substantially horizontal. The handgrip is operatively coupled to the telescoping portion.

The control system may also include three switches or switch systems to sense motion or urging of each of the three movable portions. A first switch or switch system is disposed proximate to the first pivotable portion for sensing clockwise or counterclockwise urging of the handgrip by the operator. A second switch or switch system is disposed proximate to the second pivotable portion for sensing up or down urging of the handgrip by the operator. A third switch is disposed proximate the telescoping portion for sensing inward or outward urging of the handgrip by the operator. Thus, the handgrip is capable of being urged in an up or down motion, a clockwise or counterclockwise motion, and an inward or outward motion to impart corresponding output signals thereby. Each of these motions may be imparted simultaneously, and therefore sensed and controlled simultaneously. Any type of switches may be employed, such as limit-type switch or pair of opposing switches, including proximity switches, non-contact type switches, controller-type switches that produce a proportionate output, and the like.

Preferably, the first pivotable portion includes a body that pivots on a substantially vertical axis. The first pivotable portion supports a substantially horizontal pin about which the second pivotable portion may pivot. The telescoping portion preferably includes an outer boom that is coupled to the first pivotable portion and extends outwardly from the pivot assembly. An inner boom extends from the outer boom and is slideable therein. The handle or handgrip is coupled to the inner boom such that movement of the handgrip may move any one or combination of the three movable portions of the control.

The first pivotable portion may be visible from outside the control system as a cylindrical body, and therefore simulates the structure of a rotatable turntable or turret of a mobile machine. The first pivotable portion may be shaped in other configurations to match the shape of the turret of the particular machine on which the control system may be employed. The second pivotable portion may (optionally) be visible from outside the control system. The pivotable portion simulates a joint of an aerial work platform, and/or provides an effective means for providing for up and down motion of the control. The telescoping portion, especially the inner boom, preferably is visible from outside the control system, and simulates the telescoping portion of the mobile machine. In this regard, the switches provide signals such that the mechanisms of the mobile machine (that is, for example, the turret, articulating or elevating joint(s), and telescoping boom) rotate and/or telescope in the same direction that the corresponding structure of the control system is urged.

According to another aspect of the present invention, a control for operating a mobile machine includes a structure having movable members that simulate and correspond to the mechanisms of the mobile machine. The movable members are capable of movements by the operator that impart corresponding motions to the corresponding mechanisms of the mobile machine. The structure is capable of being structurally mounted to the platform at an operator station that is disposed on the platform.

At least three bi-directional motion controls are provided that each operate one of two separate sensors when the control is moved in one of two opposite directions. The motion controls thus provide for motion of the corresponding mechanisms of the mobile machine in the opposing directions, such that the mobile machine undergoes motions that correspond to movements imparted to the control by the operator whereby recognition and comprehension by the operator is expedited and enhanced. The three bi-directional controls preferably are incorporated within the analog control in a single unit.

Preferably, springs are coupled to each one of the three moveable portions of the control so as to urge each one of the moveable portions to its neutral state, at which the switches are disengaged. Each of the switches may be a bi-directional switch such that motion of the control may be sensed in either a positive or negative direction (that is, clockwise or counterclockwise, up or down, or retract and extend, respectively). A safety switch and/or trigger may be included to provide lock out, driving, and numerous other safety and operational functions.

The handle or handgrip of the present invention may also be capable of pivoting clockwise or counterclockwise relative to the control boom to which it is attached. Devices within the control, such as within the boom structure, move in response to pivoting of the handle. Switches sense the movement of these devices and provide a signal for control of a portion of the mobile machine. Pivoting the handgrip for an added control is suitable for a crane that includes both a main boom and a jib boom. Further, the handle or handgrip may be disposed in various orientations, including, for example, pointing upward and away from the movable portions of the control such that a cover of the control serves as an operator arm rest. The orientation of the handle may be chosen according to the most advantageous direction that the operator may face with respect to the particular machine on which the control is employed.

According to another aspect of the present invention, the mobile machine comprises an aerial work platform, having a chassis, an elevating mechanism and an operator platform. The operator platform having a control device for controlling the aerial work platform. The control device includes a fixed portion, a first pivotable portion, a control pivotable boom, a handle or handgrip, and at least one switch system.

The fixed portion is secured to the operator platform, and the first pivotable portion is pivotable on the fixed portion upon clockwise and counterclockwise urging by the operator. The control boom includes a control inner boom that is inwardly and outwardly urgeable along a longitudinal axis of the control boom. A first end of the control boom is coupled to the handle and a second end is coupled to the first pivotable portion. The control system includes a pair of switches. A first switch system is disposed (that is, has an operative component on) a moveable portion of the pivotable portion and is activated by the motion of the pivotable portion upon urging by the operator. A second switch system is disposed on a moveable portion of the control boom and is activated by the motion of the control boom upon urging by the operator. A third switch system is disposed on the control boom and is activated by the motion of the telescoping portion of the boom upon urging by the operator. The first, second, and third switch systems enable signals whereby the aerial work platform may be controlled. Also, a portion of the control device enhances comprehension of the operation of the aerial work platform by the operator. Thus, the control may consist of three bi-directional controls according to an aspect of the present invention. However, the control may also include additional bi-directional controls, as required.

According to another aspect of the present invention, a mobile machine having a chassis and a power system for providing power to components of the mobile machine is provided. The mechanisms of the mobile machine include a main boom mounted on a rotatable platform at a pivotable joint. The main boom is capable of telescoping inwardly and outwardly, elevating about the pivotable joint, and rotating on the rotatable platform. The mobile machine also includes a control device that is mounted on an operator platform for effecting telescoping motion of the boom. The control device includes a fixed portion, a first and a second pivotable portion, a control boom, and a handle or handgrip.

The fixed portion is secured to the operator platform. The first pivotable portion is pivotable on the fixed portion and is clockwise and counterclockwise urgeable relative thereto so as to provide a signal for corresponding clockwise and counterclockwise rotation of the rotating platform. The second pivotable portion is coupled to the first pivotable portion and is upwardly and downwardly pivotable relative to the first pivotable portion so as to provide a signal for corresponding upward and downward movement of the main boom about the pivotable joint. The control boom includes a control inner boom that is inwardly and outwardly urgeable along a longitudinal axis of the control boom so as to provide a signal for corresponding inward and outward telescoping of the main boom of the mobile machine. The control boom has a first end and a second end that is coupled to the pivotable portion. The handle is coupled to the first end of the control boom for imparting motion thereto by an operator. The control of the mobile machine includes switches for sensing movement of the moveable portions of the control.

The mobile machine may also include, according to another aspect of the present invention, a linkage coupling a support of the control device to the main boom or like structure of a moveable machine such that a movement of the main boom about the pivotable joint moves the control device in a corresponding direction (such as, for example, clockwise or counterclockwise). The mobile machine may also include a jib boom disposed at a distal end of the main boom. The control device may also include a simulated jib boom disposed at a distal end of the control boom, whereby the recognition of the structure of the main boom and jib boom is enhanced and comprehension of the function of the control device is enhanced. The control of the mobile machine may also include a mechanism for sensing pivoting of the handle to control the jib boom. The mobile machine may orient the control device such that each one of its pivotable portions are disposed at an end proximate the operator, thereby enhancing recognition and comprehension by the operator. In this regard, the operator can look ahead and downward and see the motion that he imparts to the control system while following motions of the boom at the same time.

Some embodiments of the control systems described herein provide a single control that includes the three primary boom motions: lift, swing, and telescope. Further, the three motions may be controlled by one hand (that is, by either hand) of the operator. This eliminates the time the operator uses to select a specific control and transfer his hand to that control, and provides other apparent advantages. Because the operator does not have to select a control, such as one of three or four primary control levers (that may be identical) as in prior control devices, the probability of error is reduced, among other advantages.

Preferably, the moveable portions of the control are simulated parts of the mobile machine in that they include many or most of the structure and functional aspects of the corresponding machines part. For example, the inner and outer booms or tubes described herein simulate the corresponding structure of the machine for which the control is designed. Upon initially encountering the control including the simulated booms or tubes, an operator will recognize that such structure corresponds to the structure of the machine, and will comprehend that extending or telescoping the inner boom outwardly relative to the outer boom will produce such a motion in the machine.

In this regard, the analog control as described herein provides greater efficiency for both cranes and aerial platforms and the operator, thereby realizing a significant cost advantage. It appears that it may provide a valuable safety improvement as compared to other control arrangements, among other advantages.

BRIEF DESCRIPTION OF THE FIGURES

FIG. 4 is a side elevation view, partially broken away of, a portion of the embodiment shown in FIG. 1;

FIG. 5 is a side elevation view, partially broken away, showing another portion of the embodiment shown in FIG. 1;

FIG. 6 is a side elevation view, partially broken away, of a portion of another embodiment of the present invention;

FIG. 7 is a side elevation view, partially broken away, of a portion of another embodiment of the present invention;

DESCRIPTION OF THE PREFERRED EMBODIMENTS

The present invention is illustrated by reference to particular preferred embodiments, which are shown in the figures and described herein. The present invention encompasses employing other mechanical components, mechanisms, and systems, as well as electrical components, that utilize the principles and advantages of the present invention, in accordance with the teachings herein. Therefore, the present invention is not limited to the particular embodiments disclosed herein. Rather, the present invention encompasses numerous modifications and alternatives, as will be apparent to persons familiar with the ANSI/SIA standards and/or work platform controls and safety issues in light of the present disclosure. Co-pending U.S. patent application Ser. No. 08/672,427, filed Jun. 28, 1996, now U.S. Pat. No. 6,170,606, which is incorporated herein by reference in its entirety, teaches an analog control system.

Figure 1:
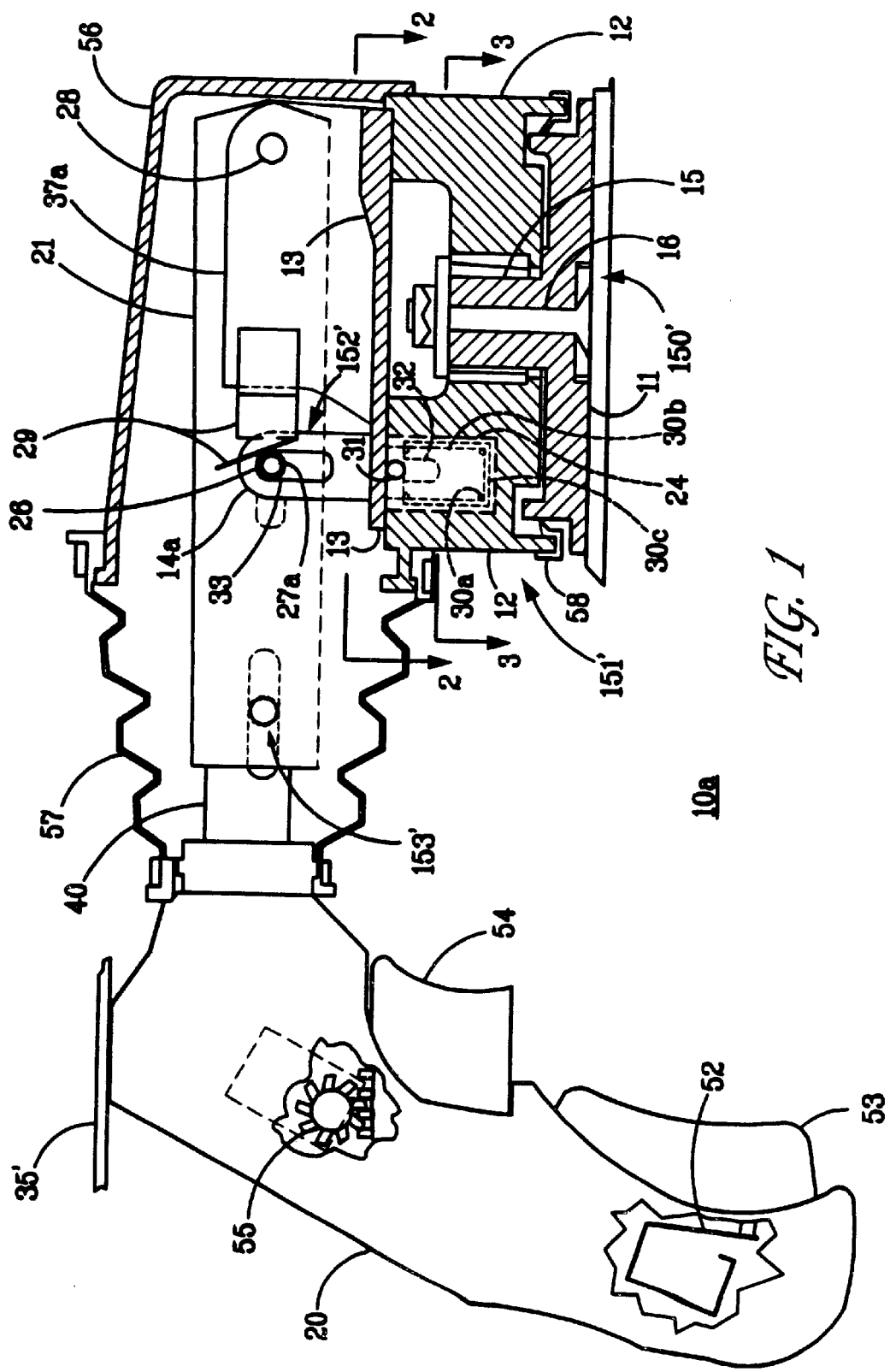
FIG. 1 is a side elevation view, partially broken away, illustrating an analog control according to an embodiment of the present invention.

Referring to FIG. 1, to illustrate an embodiment of the present invention, an analog control system 10a is disclosed for an aerial work platform (illustrated diagrammatically in FIG. 1 by reference numeral 150') having a rotating turntable or turret and a telescoping boom supported from the turret. As will be understood by persons familiar with such aerial work platforms, the turntable of the aerial work platform may be mounted on a self-propelled chassis (not shown in FIG. 1) (for example, ANSI/SIA Type 2) or on a commercial truck or trailer chassis (for example, ANSI/SIA Type 1), and can rotate about the vertical axis of the turntable and chassis. The structure 150' encompasses any type of chassis on which is mounted an appropriate work platform, as well the aerial work platform.

The boom (or booms) of an aerial work platform that may employ the analog control according to the present invention, such as control 10a, is often operated hydraulically for raising, lowering, telescoping, and swinging about the vertical axis of the turntable. Such a boom is typically attached to the top of the turntable and equipped with power means to raise and lower the boom. The free end of the boom is fitted with an operator platform where the operator stands.

As shown in the embodiment of FIG. 1, the analog control, such as control 10a, according to an aspect of the present invention, may be mounted on the operator platform such that the operator is enabled to effect motion of the operator platform thereby. The control 10a simulates the structure of the aerial platform, which may include the components above the chassis of the aerial platform. Specifically, some mechanical portions of the control 10a provide a small scale or miniature model of portions of the aerial work platform on which the control 10a is mounted. As employed herein, the term "aerial work platform" refers generally to any device that is capable of raising an operator platform, an operator bucket, or other type of device in which an operator may ride, and includes the mechanism, power systems, chassis, and structure for raising and lowering the operator platform or the like. The term "chassis," as employed herein, refers to any structure that supports the turntable, elevating mechanism and operators platform, and includes trucks, self-propelled vehicles, and stationary platforms. The term "mobile machine" refers to a combination of any platform and any chassis.

As shown in FIGS. 1 through 5, an analog control 10a includes a handgrip 20 that is coupled to rotatable structure, an articulating or cantilevered pivoting structure, and a telescoping structure. Each of these three structures is, to a limit, moveable and as such provides three bidirectional motions to analog control 10a. In this regard, the term "bi-directional" refers to having motions in both a plus and minus direction.

As shown in FIG. 1, FIG. 2, FIG. 3, FIG. 4, and FIG. 5 and described more fully below, springs are provided to return control handgrip 20 to its neutral position for each of three bi-directional motions. As described more fully below, the three primary motions operate or release switches to control and maneuver the turntable, boom, and operator platform. In the embodiment shown in FIG. 1, six individual switches are employed.

The present invention encompasses employing fewer than the six switches shown, including having three bi-directional switches, each of which being operable in two opposite directions to cause equivalent motion of the device, or any other number of switches that may be configured to sense the urging of the handgrip by an operator, as will be understood by persons familiar with switch and/or control technology in light of the present disclosure. Each of the bi-directional switches replace an opposing pair of limit-type switches because the bi-directional switches are capable of sensing displacement in each opposing direction.

Furthermore, the embodiments and aspects of the present invention are illustrated by describing on-off or limit-type switches. The present invention, however, encompasses controller-type switches that provide an electrical output signal proportional to the displacement of the switch. In this regard, it will be clear to persons familiar with switch and control technology that switches providing such proportional electrical output may be employed in place of the limit-type switches described herein. The present invention encompasses employing additional, conventional logic such that the control systems employing control including controller-type switches provide signals that control not only the direction of the corresponding components of the aerial platform, but also the speed of the movements thereof. The speed of the movements of the components of the aerial work platform (such as, for example, boom extension and platform rotation) may be proportional to either the speed or the force applied to impart displacement of the control (such as, a simulated boom and platform of the control). Any of the switches described herein, including an opposing pair of limit-type switches, a bi-directional switch, or one or more controller-type switches may be referred to herein as a switch system.

Analog control 10a includes the rotating portion 151', the elevating portion 152', and the telescoping portion 153'. The rotating mechanism includes a base 11, a rotating structure 12, and a top 13, and is best shown in FIG. 1, which is taken in a vertical cut through the center of the control 10a, except for an outer boom 21 and handgrip 20. A simulated version of an operator platform or operator bucket 35' may be disposed on a top portion of handgrip 20 to facilitate recognition and comprehension by the operator.

Figure 2:
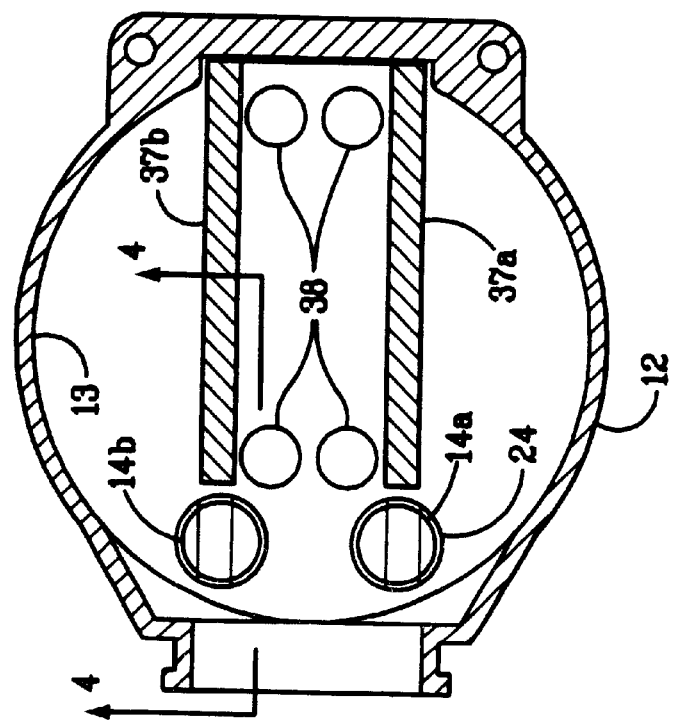
FIG. 2 is a top sectional view showing a portion of the embodiment shown in FIG. 1, taken through lines 2—2.

Base 11 is attached by bolts or other suitable fasteners to the structure 150' at a location convenient to the operator on the platform of the aerial platform. Rotating structure 12 is supported on base 11 by a spindle 15 and is attached by a bolt 16 such that it can rotate left or right from the neutral position. As shown in FIG. 2, a pair of ribs 37a and 37b extend from top 13, and preferably are formed as integral portions of top 13. Ribs 37a and 37b are located on opposing sides of boom 21, which is described more fully below, to support boom 21 by means of bolt 28 and to distribute forces from boom 21, shown in FIG. 1, to rotatable structure 12 by means of bolts 38, shown in FIG. 2.

Figure 3:
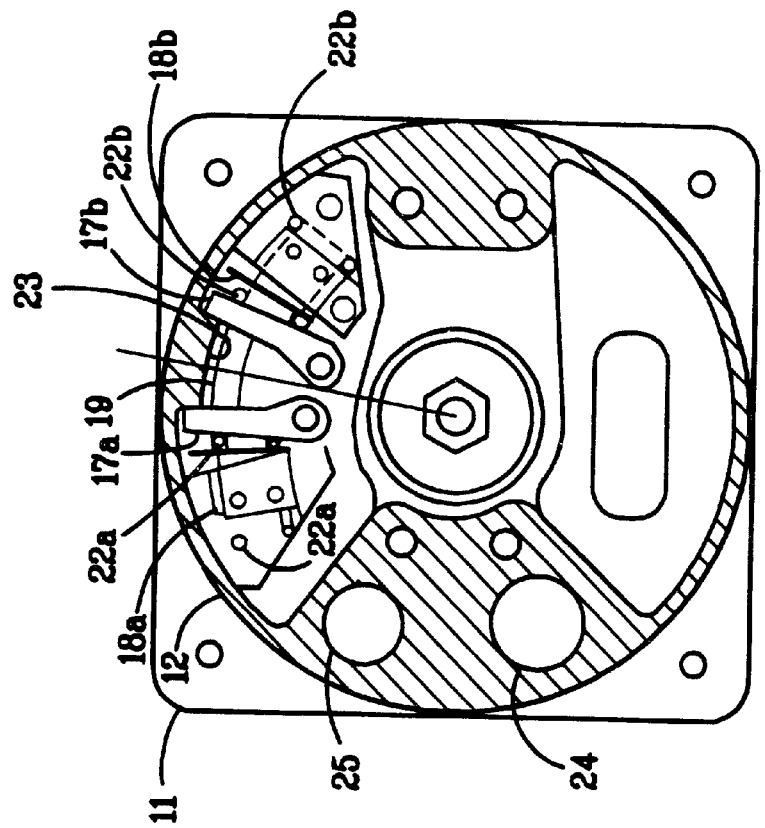
FIG. 3 is a top sectional view of another portion of the embodiment shown FIG. 1, taken through lines 3—3.

As shown in FIG. 3, which shows a sectional view through control 10a, a pair of levers 17a and 17b, a pair of switches 18a and 18b are affixed to rotating structure 12. Switches 18a and 18b are disposed on the outboard sides of levers 17a and 17b, which each include a fixed end at which a pivot is formed and a free end. A post 19 is disposed between the free ends of levers 17a and 17b and is fixed to base 11, which does not rotate with rotatable member 12. A cavity may be formed on the underside of rotating structure 12 to provide space for such structure. A stop 23 is integrally formed on the rotating structure between levers 17a and 17b Rotation of structure 12 in a clockwise direction, as oriented in FIG. 3, will cause lever 17a to actuate rotate switch 18a because post 19 is urged against the free end of lever 17a to move it to the left to engage rotate switch 18a. Similarly, when the operator rotates structure 12 in a counterclockwise direction, switch 18b is operated by lever 17b and it contacts post 19, which again remains stationary.

The cavity within rotating structure 12 also include a pair of springs 22a and 22b on opposing, outboard sides of levers 17a and 17b. During their operation of switch 18a or switch 18b, lever 17a or 17b compresses springs 22a or 22a, respectively, which provides a restorative force to return the levers and interconnected handgrip 20 to the neutral position (that is, the rest position). Levers 17a and 17b are stopped with handgrip 20 in the neutral position by stop 23, which is an integral part of rotating structure 12. Because of their orientation on opposing sides of stop 23, the forces developed by each of the springs 18a and 18b do not cancel or reduce the restorative forces of each other.

The elevating portion 152' includes a pair of links 14a and 14b, a pair of opposing switches 29 and 34, and a pair of opposing springs 30a and 30b. Again referring to FIG. 3, rotating structure 12 also includes holes to accommodate links 14a and 14b. Uplink 14a, as shown in FIG. 1, is on the near side of boom 21 and is operated by a bolt 26, which clamps a bushing 27a to outer boom 21. When handgrip 20 is raised causing boom 21 to be raised by pivoting around hinge bolt 28, uplink 14a is raised causing bushing 27a to operate up-switch 29.

Compression spring 30a is attached by cylinder 30b to uplink 14a, and is retained in hole 24 by pin 31. Pin 31 is retained in a slot in structure 12 by lop 13. Slot 32 in uplink 14A permits upward motion of boom 21 until slot 32 in cylinder 30b is stopped by pin 31. Cylider 30b is formed around uplink 14a and affixed thereto to enclose spring 30a. In this way, spring 30a is fastened to the bottom end of uplink 14a to urge uplink 14a downwardly. Spring 30a is restrained from moving upward by pin 31 and is, therefore, compressed between pin 31 and a lower plate 30c of cylinder 30b. Thus, spring 30a ceases uplink 14A and boom 21 to return to neutral if handgrip 20 is released (after it is urged upward by the operator) and releases up-switch 29 and terminates upward motion of the boom of the aerial work platform.

When handgrip 20 is lowered to lower the boom of the aerial platform, bolt 26 and bushing 27a pass downward in slot 33 in uplink 14a without any effect on upswitch 29 or any resistance from spring 30A. This permits the upward travel of boom 21 to be separated from the downward travel and mechanism.

The mechanisms for sensing and providing a signal relating to downward travel of boom 21, as well as downlink 14b, are shown in FIG. 4, which is a partial vertical sectional view taken just off a centerline of boom 21, as shown in FIG. 2. Down link 14b is made to cooperate with a slot 35 located so that, if the operator of the aerial platform raises handgrip 20 (and boom 21), link 14b is not caused to move upward by contact with bushing 27b, which is clamped to boom 21 by bolt 26. As shown in FIG. 4, when handgrip 20 and boom 21 are lowered by the operator, contact by bushing 27b causes link 14b to be pushed downward, thereby compressing spring 39, which is disposed within hole 25. Such downward movement also operates a down switch 34 by means of a tab 36, which is a part of, and extends outwardly from, down link 14b. Spring 39 urges against the bottom of hole 25 and upwardly against downlink 14b, such that when the operator releases handgrip 20, spring 39 causes down link 14b and boom 21 to return to the neutral position. Further upward travel of link 14b is prevented by contact of tab 36 with the underside of top 13.

The operation of the down switch may, alternatively, be accomplished by a bushing on bolt 26 that could extend through both sides of boom 21 to also serve as a stop for the telescoping mechanism of the control. In such an alternative configuration (not shown) the down switch would be located similar to up switch 29, but reversed such that it would be operated when handgrip 20 and boom 21 are lowered. Such an alternative configuration will be easily understood by persons familiar with controls of the conventional type discussed in the background section, or persons generally familiar with control and switches, in light of the present disclosure.

Referring to FIG. 5, which is a side view and partial sectional view, outer boom 21, inner boom 40 and related parts form the boom telescoping mechanism 153. A hinge bolt 28 attaches outer boom 21 to ribs 37a and 37b of top 13. Inner boom 40 slides within controlled limits. Bolt 26, as previously explained, extends through outer boom 21 and clamps bushings 27a and 27b onto outer boom 21. Bolt 26 passes through a slot 48 in both sides of inner boom 40. In like fashion, another bolt 43 passes through holes in outer boom 21 and a slot 42 in inner boom 40, and is clamped onto the outside of boom 21. This configuration permits inner boom 40 to move within outer boom 21 when the operator pulls handgrip 20 to cause the boom of the aerial platform to extend (that is, telescope out) or pushes handgrip 20 to cause the boom of the aerial platform to retract (that is, telescope in).

The length of slots 42 and 48 may be determined by the desired degree of the telescoping motions for the operator. A spring 44 is located between bolt 26 and bolt 43 within inner boom 40. To serve as a fixed rest for spring 44, a pair of opposing blocks 45 and 46 are fastened inside inner boom 40. Block 45 has open slot 47 and block 46 has slot 41 which permit inner boom 40 to move outwardly (to the left in FIG. 5) until slot 41 bottoms on bolt 26, and permit inner boom 40 to move inwardly (to the right in FIG. 5) until slot 42 bottoms on bolt 43. As inner boom 40 moves to the left it compresses spring 44, which is restrained by bolt 43, whereby a force is developed to return inner boom 40 and handgrip 20 to the neutral position. Likewise, when handgrip 20 and inner boom 40 are moved to the right, spring 44 is restrained by bolt 26, thereby developing the desired return force. In summary, spring 44 is restrained between bolts 26 and 43 and is compressed by block 45 or block 46 which are permitted to move only because of respective slots 41 or 47 which straddle the fixed bolts clamped to outer boom 21. In this manner spring 44 alone returns inner boom 40 and handgrip 20 to the neutral position from either operating position.

In order to send appropriate signals to the mechanisms which cause telescoping of the boom in or out, a pair of magnetic switches 50 and 51 are disposed on outer boom 21 and are located in the control to respond to the movement of handgrip 20 and inner boom 40. As shown in FIG. 5, permanent magnet 49 is located in block 46 and inner boom 40 so that it is close to the inner surface of outer boom 21, which is made of aluminum or other material that permits magnetic radiation to pass through it. Magnetic switch 50 is affixed to outer boom 21 at a location such that when handgrip 20 and inner boom 40 are pushed to the right in FIG. 5 by the operator, magnet 49 operates magnetic switch 50 giving a signal to telescope in (retract) the boom of the aerial platform. Likewise, magnetic switch 51 is located on the outside of outer boom 21 such that it is operated when handgrip 20 and inner boom 40 with block 46 attached are moved to the left resulting in a signal to extend (telescope out) the boom of the aerial platform. Alternatively, limit switches may be employed in place of the magnetic switches, as described below with respect to FIG. 6.

As part of handgrip 20, a safety switch 52 is located so that it will prevent any electrical power being supplied to the motion switches (18a, 18b, 29, 34, 49, and 50) that send signals to the operating mechanisms of the aerial platform, unless operated by the operator. Switch 52 is located in handgrip 20 and is operated by a safety lever 53 that is formed as part of a base portion of the handgrip. In this regard, when the operator grasps handgrip 20 and depresses safety lever 53, switch 52 is activated, thereby directing power to the switches noted above. By this means all power to the control switches and motion of the platform may be terminated by the operator by simply releasing the handgrip, an important safety feature. The present invention encompasses mechanical interlocks that mechanically lock the control system in place unless a safety switch is depressed. The present invention also encompasses electrical interlocks that electrically lock the control system and/or electrically disable the control unless a safety switch is depressed. Such interlocks are described in co-pending U.S. patent application Ser. No. 08/672,427, now U.S. Pat. No. 6,170,606, which is incorporated herein by reference in its entirety, and will be apparent to persons familiar with such controls and/or safety features in light of the present disclosure.

Handgrip 20 also includes a trigger 54, which preferably is disposed above safety lever 53 and can be actuated independently therefrom. Trigger 54, which may be actuated by the operator's forefinger of the hand that grips handgrip 20, enables any function that the operators desires in order to reposition the platform, or may be helpful in the other operations of the particular machine. For example, it may be desirable to have the capability of variable speed of operation when approaching an obstacle or fragile structure. In this regard, after operating safety lever 52, the operator may be trained to select one (or more) of the motions desired and to then obtain the desired speed by pulling trigger 54 such that the speed or motor power (or other motor parameter) is proportionate to the force applied to trigger 54. This type control, termed proportional, is desirable to minimize jerky motion and rough ride that may result from the use of simple on or off controls. Trigger 54, by means of a rack (linear gear) on one surface, provides rotational motion of potentiometer gear 55 that varies with the amount of motion imparted to trigger 54 so the operator can control the speed of the particular motion or motions that he selects. The electronic controls for receiving the signals from the switches described herein will be apparent to persons familiar with controlling aerial work platforms or other machinery, or to persons generally familiar with controls. Within the electronics provided with the control, circuits and other devices and systems may be provided that provide a feature termed "ramp up" and "ramp down." These features initiate motions gradually to the speed selected and, similarly, reduce speed gradually to zero thereby limiting acceleration and deceleration of the platform to a desirable level. This feature is important and beneficial on boom supported aerial platforms because of the inherent elastic deflection of the boom as the platform is moved and stopped.

Analog control 10a includes a cover 56 over rotating structure 12, as shown in FIG. 1, and a bellows seal 57 and another seal 58 to inhibit contaminants from entering into cover 56 and contacting the mechanisms therein. Cover 56 is attached to structure 12. Bellows 57 is flexible to accommodate up and down motion of boom 21 and telescoping motion of inner boom 40. An outer end of bellows 57 is clamped to handgrip 20 to provide protection for the telescoping boom area. Seal 58, which preferably is a lip or v-seal as shown in FIG. 1, is located between rotating structure 12 and base 11 to minimize contamination that might enter at that location. Additional embodiments are described herein with illustrations that show a particular portion of the particular embodiment. For convenience and clarity, other features of such additional embodiments are omitted from the figures. Persons familiar with controls of the general type discussed herein will understand the additional structure that may be employed with such additional embodiments, including corresponding components in the first embodiment control system 10a, prior art structure and/or systems, and any combination thereof. For example, handgrip 20, rotating portion 151', and telescoping portion 153' or other suitable, corresponding structure may be employed with control system 10b and/or control system 10'. In this regard, these items may be shown as blocks in the figures corresponding to those embodiments to illustrate that such items may be employed therewith.

According to another embodiment of the invention, a control system 10b, which is shown in FIG. 6, illustrates that typical mechanical on/off switches 66 and 67 may be employed, rather than the magnet and magnetic switches shown in FIG. 5, for sensing the telescoping motion of inner boom 21 and transmitting corresponding signals to the operating mechanism of the aerial platform. In such an alternative embodiment, an outer boom 59 and inner boom 65 are similar to outer boom 21 and inner boom 40, respectively, as described above except for the application and support of mechanical switches. Except as shown in FIG. 6 and described herein, the control system 10b may employ other structure and systems as described with respect to the first embodiment 10a.

Outer boom 59 supports and encloses telescope-out switch 67 and telescope-in switch 66. Block 61, which may be similar to block 46, has an extension 62 that protrudes toward the switches. Block 61 includes a tab 63 as well as stiffening rib 64 that protrudes downwardly therefrom. Block 61 is sized to closely match the inner surface of outer boom 59 and is attached to inner boom 65. It can be seen that when inner boom 65 is pushed in (that is, to the right in FIG. 6), block 61 will move to the right and tab 63 will contact telescope-in switch 66, thereby causing it to operate and send a signal to the telescope mechanism of the aerial platform to retract (telescope in) the boom of the aerial platform. Likewise, when inner boom 65 is pulled out (that is, to the left in FIG. 6) by the operator, tab 63 of block 61 contacts and operates telescope-out switch 67 causing a signal to the telescope mechanism of the aerial platform and causing the boom of the aerial platform to extend (telescope out). The analogy of the boom motion to that of the control motion, and the corresponding ease of recognition and comprehension by an operator, is clear and obvious.

By configuring the telescoping switches 66 and 67 on opposing sides of a member joined to the inner boom, the two switches that cause telescoping motion of the boom of the aerial platform are completely contained within the boom of the control. For this embodiment, a square or rectangular cross section of outer boom 59 and inner boom 61 has been demonstrated to have the most advantages. However, any cross section from round to rectangular may be used for the embodiment shown in FIG. 6 or for any other embodiment designed for a specific application and control.

FIG. 7 illustrates a portion of another embodiment of the present invention, and relates particularly to an articulating or elevating portion of an analog control to provide for upward and downward controls thereof. A control system 10c provides a lift-up switch 73 and a lift-down switch 74 within the body of the control. An outer boom 70 is inserted into a fitting 68, which encloses and secures boom 70, preferably on all sides. Fitting 68 includes flanges 69a and 69b that extend downward from opposing sides of outer boom 70 and are affixed to a body 80 of the control. A cover 72, only a portion of which is shown in FIG. 7, may enclose the boom and other components as described above with respect to cover 56. Flange 69a, which is on the near side of boom 70 in FIG. 7, is transparent. Outer boom 70 and fitting 68 are attached and provide the capability to pivot relative to body 80 by a bolt 60, which also passes through ribs extending upward from top 71. Top 71 may be attached to body 80 by suitable vertical bolts. A pair of springs 75 and 76 is provided to operate to return the telescoping mechanism to its neutral position. Spring 76 is disposed in contact with an upwardly facing surface of at least one of the flanges 69a and 69b, and spring 75 is disposed in contact with a downwardly-facing surface of at least one of the flanges 69a and 69b and opposing spring 76. In this regard, flanges 69a and 69b serve to: act as operating levers for lift-up switch 73 and lift-down switch 74; compress spring 75 or spring 76 which return flange 69a or flange 69b and the control mechanism to neutral; and act as stops for the up and down motions of the articulating portion of the control 10c. Flanges 69a and 69b preferably depend from the boom such that opposing sides of a first portion provides for actuation of the switches and opposing sides of a second portion provides surfaces against which springs 75 and 76 may urge.

A spring capsule 78, which encloses lift-down spring 75, is fitted into an appropriate cavity, which is part of top 71. Spring 75 is restrained, for example, to the length shown in FIG. 7 by capsule 78 to prevent force being applied to flange 69B to rotate boom fitting 68 and boom 70 clockwise. Likewise, spring 76 is restrained by capsule 79 to prevent force being applied to rotate boom fitting 68 counterclockwise. In this manner inner boom 77 and attached handgrip 20 are spring loaded to the neutral position but are provided with a restoring force that can be defined accurately to meet the operator's feel from a human factors standpoint. In addition, the weight of the handgrip and mechanism must be included in the analysis of the required spring force so two different springs are ideal in providing design flexibility.

Lift-up switch 73 is actuated when control handgrip 20, inner boom 77, and outer boom 70 are raised by the operator, which causes flange 69A of fitting 68 to rotate clockwise (in the orientation shown in FIG. 7) and actuate lift-up switch 73. When the handgrip and booms are lowered by the operator, lift-down switch 74 is similarly actuated. The switches 73 and 74 thereby send a signal to lower the boom of the aerial platform, which may raise or lower the boom in response to receiving such a signal, as will be understood by persons familiar with controls of aerial work platforms. Spring capsule 78, which encloses lift-down spring 75, is fitted into an appropriate cavity which is part of top 71. Spring 75 is restrained to the length shown in FIG. 7 by capsule 78 to prevent force being applied to flange 69B to rotate boom fitting 68 and boom 70 clockwise. Likewise, spring 76 is restrained by capsule 79 to prevent force being applied to rotate boom fitting 68 counterclockwise. In this manner inner boom 77 and attached handgrip 20 are spring loaded to the neutral position but are provided with a restoring force that can be defined accurately to meet the operator's feel from a human factors standpoint. In addition, the weight of the handgrip and mechanism must be included in the analysis of the required spring force so two different springs are ideal in providing design flexibility.

Figure 8:
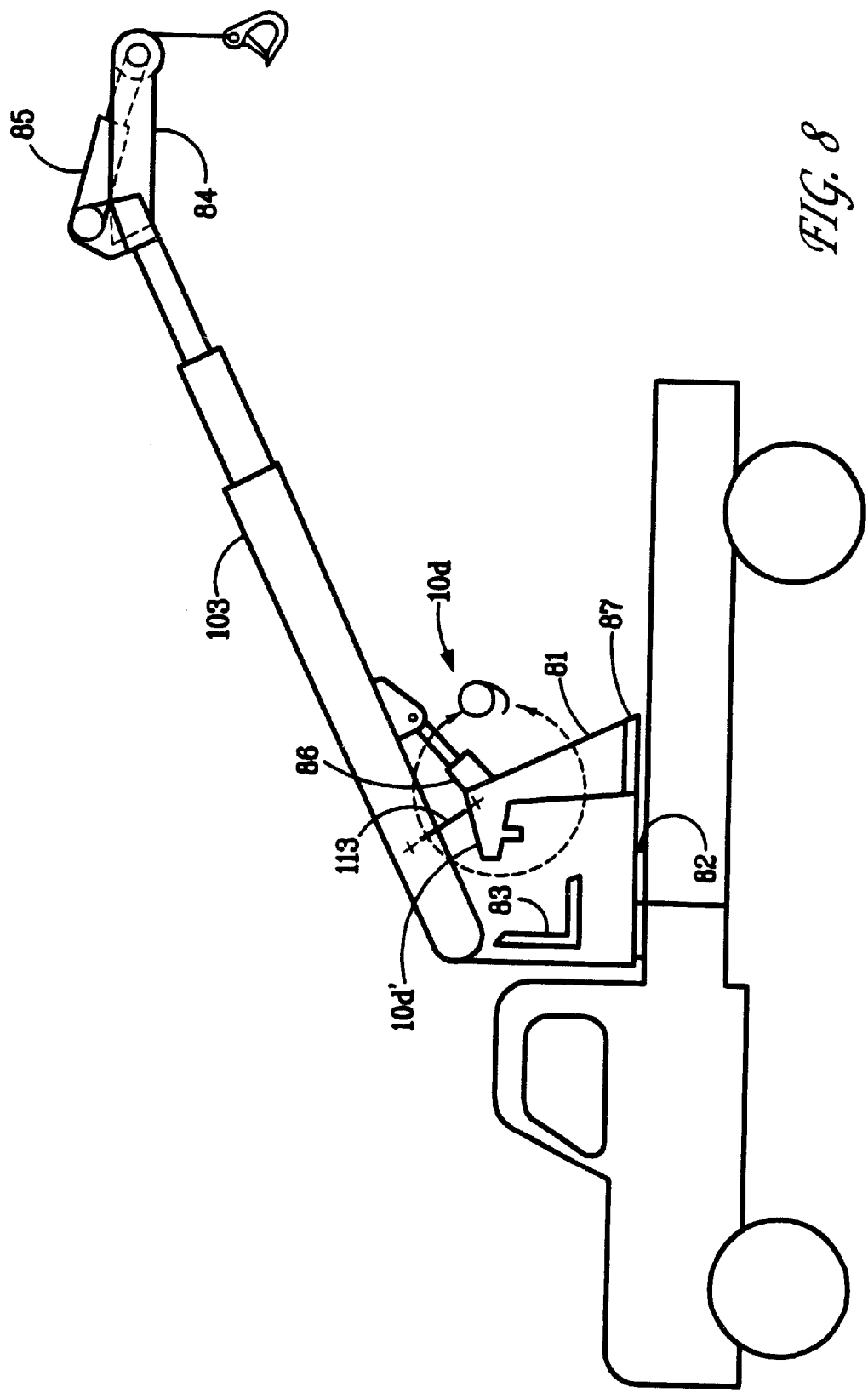
FIG. 8 is a side elevation view of another aspect of the present invention showing the location of an analog control mounted on a truck mounted crane having a telescoping boom.
Figure 9:
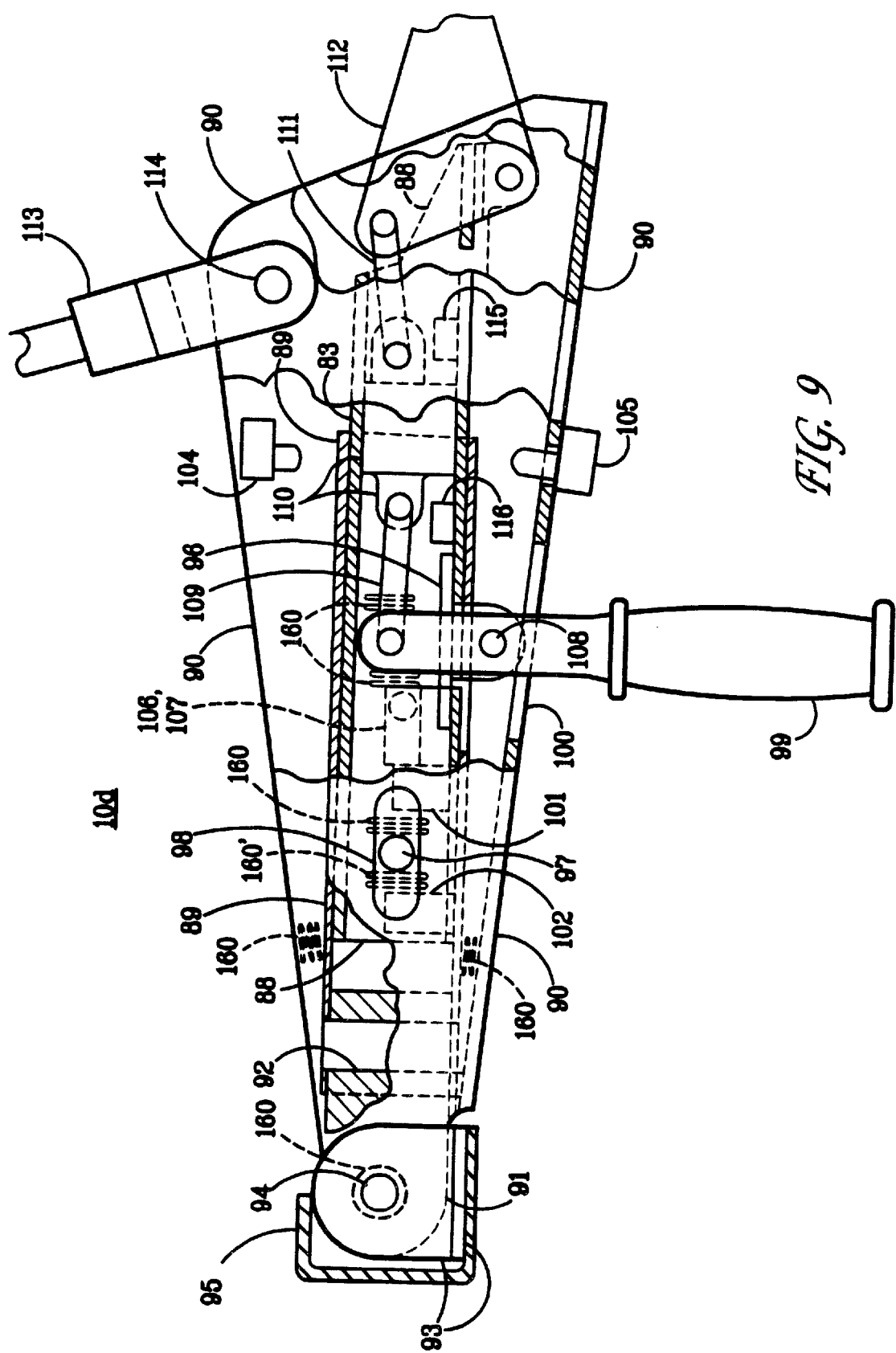
FIG. 9 is an enlarged side view, partially cut broken away, of a portion of the control shown in FIG. 8.

Embodiments of control system 10a, 10b, and 10c, illustrate the control of the present invention employed with an aerial work platform on which an operator may be carried. According to another aspect of the present invention, an embodiment of a control system that may be employed for use on hydraulic cranes is shown in FIG. 8 and FIG. 9. The control is shown on a telescoping boom, truck-mounted crane, but the present invention is not limited thereto. Rather, the present invention encompasses any variety of cranes and like devices, including, for example, self-propelled cranes having a rotatable turntable on which the crane boom and mechanism are mounted, a crane with an articulating boom by controlling the upper boom by the telescoping mechanism of the control described herein, telescopic material handlers, boom type graders, other self-propelled or stationary construction machines, earth moving machines, and the like. Furthermore, the control according to the broad principles disclosed herein, may be applied to forklift trucks and backhoes.

Referring to FIG. 8 to illustrate an embodiment of this aspect of the present invention, a control system 10d is coupled onto a truck-mounted crane. Such a crane may include a pedestal 81, a rotatable turntable 87, a boom system (including main boom 103), and a jib boom 84. Turntable 87, to which pedestal 81 is attached and supported, swings or rotates on a turntable bearing 82, which is affixed to the truck or other suitable structure. An operator's seat 83 preferably is supported on the turntable and positioned at one side of the boom at a convenient height so as to be oriented so that the operator naturally looks toward the boom tip and any load which may be lifted by the crane. It is understood that the present invention encompasses any conventional means for providing movement to the components of the crane, including for example, a hydraulic power unit and corresponding cylinders, which are omitted from FIG. 8 for clarity and simplicity.

In FIG. 8, the crane that is employed to illustrate the control system is shown having a boom system including three telescoping boom sections and also jib boom 84. The jib boom provides additional height and reach and may be adjusted independently of the main boom or may be fixed in a specific location and angle. In this embodiment of the analog control 10d, the jib boom is shown with a powered jib cylinder 85 that is also controlled by the analog control system 10d. As shown in FIG. 8, the main boom 103 is raised by a lift cylinder 86, which in turn is supported on rotatable turntable 87.

Pedestal 81 supports analog control 10d. As shown in FIG. 9, which is an enlargement of the area designated by circular area 9 in FIG. 8 with portions cut away for clarity and omitting pedestal 81, control 10d is located with its distal end or left end toward the operator, who occupies seat 83. In such a configuration, the operator faces or is oriented toward both the control and the main boom tip and any load that may be on the load line, and therefore is capable of seeing simultaneously both the control 10d and the operation of the corresponding components of the crane.

Control 10d includes plural switches, an inner tube 88, an outer tube 89, a support channel 90, and a handle 99, as well as supports and linkages therefor. In this regard, a support channel 95 is affixed to or formed integrally with pedestal 81. A pair of brackets 93 extends from fixed support channel 95. Brackets 93 (one on each side of channel 90) attach fitting 91 to support channel 95.

Outer tube 89 is attached to a fitting 91 by a substantially vertical pin 92, which permits control 10d to pivot counterclockwise or clockwise (that is, as viewed by the operator's seat 83, which corresponds to the directions into or out of the plane depicted in FIG. 9) about pin 92 on a vertical axis. A pair of switches 106 and 107, which are shown in phantom in FIG. 9, are disposed on opposing sides of outer tube 89 so as to become engaged with such counter-clockwise and clockwise motions, respectively.

Fitting 91 is attached to channel 90 and brackets 93 by a substantially horizontal pin 94, which permits the outer tube 89 and fitting 91 control to rotate up and down on pin 94. A pair of switches 104 and 105 are respectively disposed above and below outer tube 89 (and/or inner tube 88) so as to become engaged therewith upon corresponding up or down movement of the tubes 88 and 89 upon urging by the operator.

A pin 97 is anchored in inner tube 88 and extends through a slot 98 formed in outer tube 89. Thus, by moving handle 99 to the right within slot 89, in the orientation depicted in FIG. 9, the operator can cause inner tube 88 to slide to the left or right within outer tube 89. A pair of switches 101 and 102, which are shown in phantom in FIG. 9, are disposed on opposing sides of pin 97 so as to become engaged with pin 97 upon such left and right (that is telescoping) motion of control 10d. Preferably, switches 101 and 102 are secured within outer boom 89, and switches 104, 105, 106, and 017 are secured to channel 90, although numerous configurations and locations of these switches are contemplated. The switches may employ conventional clips and fasteners, according to the particular configuration. Further, pairs of springs 160, which are shown schematically in FIG. 9 in phantom, may be provided to return the control 10d to its neutral position.

Thus, by grasping handle 99, which is attached to the inside of inner tube 88 in fitting 96, the operator: can move both tubes 88 and 89 up or down, thereby rotating them about pin 94; can move both tubes 88 and 89 left or right, thereby rotating them about pin 92; and/or can move inner tube inwardly or outwardly relative to outer tube 89. The operator is capable of providing a combination of such movements, such as (for example) moving handle 99 to the left, upward, and outward simultaneously to produce simultaneous three-part motion of the crane. Regarding such movements, moving inner tube 88 to the outwardly (that is, to the right as oriented in FIG. 9) causes pin 97, which is anchored in inner tube 88 and extends through slot 98 in outer tube 89, to move to the right, thereby actuating switch 101. Switch 101 causes the power system of the crane to extend the telescoping section of main boom 103. When the operator moves the handle inwardly (that is, to the left as oriented in FIG. 9), pin 97 contacts switch 102, thereby causing a signal to be sent resulting in telescoping in (retracting) main boom 103. Thus, the control motion is an analog of actual boom motion.

When the operator lifts up on handle 99, outer tube 89 pivots about pin 94, which results in contact by outer tube 89 with switch 104 and a signal to raise main boom 103. When the operator lowers handle 88, outer tube 89 contacts switch 105, which sends a signal to lower main boom 103. Thus, the up or down motion of the control is the analog of the motion of the mechanism it controls. Similarly, when the operator moves handle 99 to his left, outer tube 89 rotates about pin 92 and contacts switch 106, which sends a signal to the crane power system causing main boom 103 and turntable 87 to rotate to the left (as viewed by the operator). When the operator moves the handle to his right, outer tube 89 contacts switch 107, which send a signal to the crane power system causing main boom 103 and turntable 87 to be rotated to the right. It will be understood that switch 106 is mounted on the far side of channel 90 and has an actuator which protrudes through a hole in channel 90 to be contacted by outer tube 89. Likewise, switch 107 is located on the near side of channel 90, which is cut away in FIG. 9. Here again, the control motion is an analog of the motion it causes on the machine.

In order to provide powered control of the jib boom (if installed), a linkage assembly is provided within the control as described below. The linkage assembly includes a pin 108, a link 109, a block 110, a link 111, a simulated jib boon 112, and a pair of switches 115 and 116. Pin 108 is disposed through handle 99, and a first end of link 109 is coupled to a distal end of handle 99. A second end of link 109 is coupled to block 110, which is slideable within inner tube 88. A pair of switches 115 and 116 are disposed on opposite sides of block 110, and are preferably attached to an inner portion of inner tube 88 by suitable clips and fasteners. Link 111 is coupled to block 110 opposite link 109. An opposing end of link 111 is coupled to an upper portion of simulated jib boom 112, which includes a pin in a lower portion thereof about which the jib boom 112 can pivot to simulate the pivoting of the machine's jib boom 84.

The operator can rotate handle 99 about pin 108, anchored in fitting 96, in a vertical plane by wrist action. The top end of handle 99 engages link 109. Thereby, block 110, which can slide within inner tube 88, moves directly with rotation of handle 99 in a vertical plane. The other end of block is connected by link 111 to simulated jib boom 112. When block 110 moves to the right, it also contacts switch 115, which sends a signal to the crane power system to extend cylinder 85, thereby causing jib boom 84 to rotate clockwise (downward). Thus, the machine's jib boom moves in the same as the rotation of the handle and the same direction of the simulated jib boom 112—clockwise. Likewise, when the operator rotates handle 99 in a counterclockwise direction switch 116 is contacted by block 110, which sends a signal to raise the jib boom. When the operator rotates handle 99 in a clockwise direction, jib boom 112 is also rotated in a clockwise direction, thereby indicating to the operator that he has operated the control to cause jib boom 84 to be moved in response.

Channel 90 preferably is open on its top side so that the operator can easily glance down and see the actual motion of the control. Such visibility may be beneficial because the control 10d provides elements, including inner tube 88 and outer tube 89 and simulated jib boom 112, that are simulated or miniature versions or parts of the truck-mounted machine. In this regard, the simulated parts correspond to actual parts of the machine. The simulated part is not required to be (but is not excluded from being) a scale model of the corresponding machine part. Here the control motion is also an analog of the motion of the machine.

Many conventional cranes have provisions to elevate the main boom to a high angle in excess of 80 degrees, especially for lifting the maximum load for which the crane is rated. This could cause the motions of handle 99 to differ from the boom motion caused, especially for the telescoping function, because the main boom 103 would be oriented close to perpendicular to the orientation of control 10d. Means to prevent this disparity are shown in FIG. 9 and indicated in FIG. 8. In this regard, if main boom 103 is elevated, it can be simulated in control 10d by changing the attitude of control 10d in proportion to the boom angle. A link 113 is shown to depict means to change the attitude of the control. A proximal end of link 113 is attached by a pin 114 to the flanges of channel 90 to rotate control 10d as main boom 103 is raised. The other end of link 113 is connected to main boom 103 either by direct linkage, as indicated in FIG. 8, or by a push-pull cable. This causes the right end of the control (in FIG. 9) to be elevated when the boom is raised. This can be either a one for one proportional angle or a proportional angle less than that of main boom 103 based on actual hardware and ergonomic principles.

The control 10d is provided with the consideration for analogy or simulation with the actual crane. The present invention may be modified to further simulate the actual crane. For instance, handle 99 is shown vertically positioned but could be positioned at an angle and could be a typical pistol grip or handgrip as described herein. The pistol grip or handgrip could be located at the end closest to the operator. The handle also could be located on the top side of tubes 88 and 89 with simple changes in linkage and switch location, which will be apparent to persons familiar with such component configuration in light of the present disclosure.

Control 10*d* may also be employed on a truck-mounted crane that is not equipped with a jib boom. In such a configuration, control switches 115 and 116 may be utilized to operate other crane functions. For example, with respect to the crane's performance of its required duty, one important function is raising and lowering the crane hook with or without a load on the hook. Rotating handle 99 in a clockwise direction about pin 108 will cause the hoist rope (cable) to be lowered, and rotating handle 99 counterclockwise about pin 108 causes the hoist rope and hook to be raised. A coil or torsion spring 161 may be employed with respect to pin 94 to return control 10*d* to its neutral position. In this embodiment, simulated jib boom 112 may be omitted or replaced with a crane hook or similar device that simulates the corresponding structure of the crane.

For embodiments of the crane that employ the power-operated jib boom, such as shown in FIG. 8, the hoist rope may be controlled by a rocker switch incorporated in the control adjacent to handle 99 or by other means. The analog control described herein can be designed using a wide selection of hardware, sensors, and mechanisms for the application to cranes of various configurations. It will be understood that springs to return the control to neutral (in addition to or in place of springs 160 and 161), mechanical stops and means to locate and actuate switches may be provided. Such spring, stops, fastener, and support structure may be as generally described herein with respect to other embodiments of the control, and may be provided and/or modified according to well-understood principles, as will be understood by persons familiar with such structure and devices according to the present disclosure. Further, proportional control devices can be substituted for the switches without departing from the basic principles of the present invention.

Figure 10:
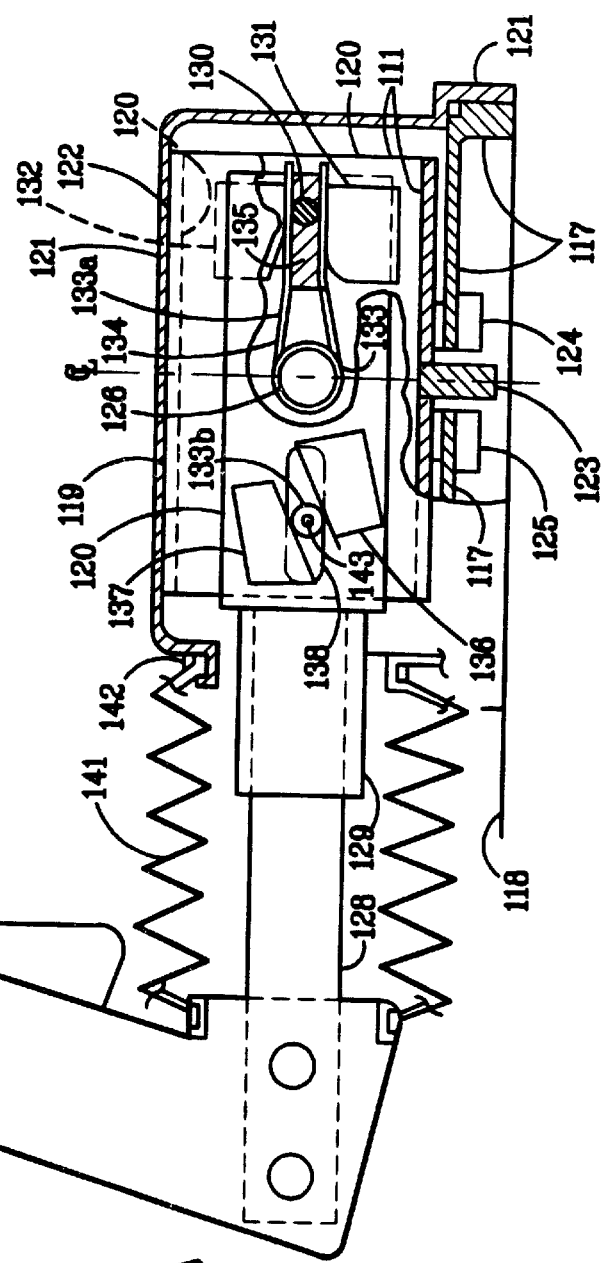
FIG. 10 is a side view, partially broken away, of another embodiment of the present invention.

According to another embodiment of the present invention, a control system 10*e* depicted in FIG. 10 includes a handgrip 127, an inner boom 128, an outer boom 129, a base 117, a yoke 119, and additional switches and mechanisms that are disposed within a cover 121. As shown FIG. 10, which is taken at or near the center of control 10*e* and is partially cut away for clarity, base 117 is attachment to structure 118, on which control 10*e* is mounted at an operator's station. Structure 118 may encompass any of the machines disclosed herein, or any other machine on which such a control may be disposed. For illustration purposes, the function of control 10*e* will be described with respect to an aerial work platform as disclosed with respect to the first embodiment 10*a* as shown in FIG. 1.

Cover 121 is attached to a pair of substantially horizontal flanges 122 of yoke 119, thereby enclosing the internal space with provisions to avoid contamination. Yoke 119 and switch mounting block 120 are attached to yoke 117 by a substantially vertical bolt or pin (not shown) at or near a center of base yoke 119 and cover 121. A pin 123 is attached fixedly to yoke 119, and extends downwardly therefrom. Note that pin 123, which is attached fixedly to yoke 119, is not at the center of yoke 110, but is near the maximum radius of base 117 (that is, near the periphery of yoke 119).

A pair of switches 124 and 125 are mounted on base 117 on opposing sides of pin 123, and are stationary even while yoke 119 is pivoted. Thus, when yoke 119 is pivoted clockwise (as viewed from above cover 121) on its attachment bolt, pin 123 contacts and operates switch 124, which sends a signal to the rotate mechanism of the aerial platform causing the turntable to rotate clockwise. Likewise, when the operator moves the control handgrip 127 in a counterclockwise direction (as viewed from above cover 121), pin 123 contacts switch 125 and sends a signal causing the turntable to rotate counterclockwise.

Yoke 119 and block 120 are interconnected by a horizontal pin 126, which permits block 120 to rotate thereabout in a vertical plane with respect to yoke 119. Raising and lowering the platform is accomplished by simply raising or lowering handgrip 127. When handgrip 127 is raised block 120 is rotated clockwise around horizontal pin 126. A pair of switches 131 and 132 are attached to block 120 on the far side thereof. Block 120 is partially cut away for clarity in FIG. 10. A pin 130 is anchored in and extends from yoke 119, and switches 131 and 132 are disposed on opposing sides of pin 130. A torsion spring 133*a* is disposed with its body around horizontal pin 126 and includes a pair of legs 134 extending therefrom. A stop 135, which extends as a post from block 120, is disposed between the opposing legs 134 of spring 133*a*. The configuration, spring coefficient, and other properties of torsion spring 133*a* may be chosen to suit ergonomic requirements, including, for example, the force and displacement relationship, the tactile feel or feedback provided to the operator, the amount of play in the handgrip 127 before the spring force is applied, and the like.

Upon upward urging of handgrip 127, block 120 pivots about horizontal pin 126 and switch 131 is urged against pin 130 to operate switch 131, which sends a signal to the mechanism which raises the boom of the aerial work platform. As handgrip 127 and block 120 are moved from their neutral position, the motion is resisted by torsion spring 133*a*. The upper leg 134 of torsion spring 133*a* is prevented from rotating by stop 135. In similar fashion, when handgrip 127 and block 120 are rotated counterclockwise by downward urging of handgrip 127, pin 130 operates down switch 131. Stop 135, because it is formed as a part of block 120, also serves to prevent the two legs 134 of torsion spring 133*a* from counteracting or diminishing the spring forces that provide operator feel and return pin 130 and block 120 to the neutral position.

Control of the extension of the boom of the aerial platform is effected by moving handgrip 127 to the right in FIG. 10 for retraction and by moving (that is, pulling) handgrip 127 to the left (in FIG. 10) for extension of the boom of the aerial platform. An extend switch 137 and a retract switch 136 are mounted on the near side of block 120 and boom 129, which is affixed to block 120. A pin 143 is anchored in inner boom 128 and extends through a slot 138, which is formed in outer boom 129 and block 120.

Upon urging of handgrip 127 to the left in FIG. 10 (that is, outward), inner boom 128 slides within outer boom 129 such that pin 143 operates extend switch 137, which sends a signal to the mechanism of the aerial platform to extend the boom of the aerial platform. A torsion spring 133*b* (only a portion of which is shown in FIG. 10) is similar to spring 133*a* and is provided to resist motion of the block 120 and handgrip 127 and return them to the neutral position when handgrip 127 is released. Likewise, upon urging of handgrip 127 inwardly, pin 143 operates retract switch 136, which sends a signal to the mechanism of the aerial platform to retract the boom of the aerial platform.

Inner boom 128 and outer boom 129 extend out from the mechanism through a hole in cover 121. That hole is large enough to permit up and down motions of the booms. However, lateral motion causes rotation of the entire unit on its central axis to provide signals for left and right motions of the boom and platform of the aerial platform, as described above. The gap between booms 128 and 129 and cover 121 is shielded by bellows 141, which is fastened to cover 121 by clamp 142 and is fastened by a similar clamp onto handgrip 127. Bellows 141 prevents contamination of the control 10e.

Thus, control 10e, handgrip 127 provides an ergonomic means for the operator to control swing, lift, and telescoping of the boom of the aerial platform using only one hand. This will expedite training of new operators and will increase productivity of both the operator and the machine. Since the operator can operate the three primary controls, and the platform moves in the direction that the control is moved, a true analog motion is obtained. For example, when the control according to any of the embodiments is disposed on an operator platform, the operator can watch the location he wants to attain while operating the analog control to make all the necessary motions to place the platform at the desired work location.

Control 10e may include a safety or enable switch 140, as shown in the lower portion of handgrip 127. An operator's hand may engage switch 140 upon squeezing handgrip 127. The purpose of this switch 140 is to have a single switch which must be operated before any electrical power is provided to the primary motion controls and, when released, terminates all electrical power to the controls. Trigger 139 provides speed control by electronic proportional devices. The operation, logic, and interlocks with respect to trigger 139 and switch 140 may be by conventional means, as will be understood by persons familiar with such equipment and systems.

According to the configuration of control 10e, the location of handgrip 127 above boom 128 provides the capability of locating the control on a flat surface, such as structure 118, without additional support means. On the other hand, handgrip 127 could easily be located on the lower side of boom 128 if such a configuration is desirable for a specific application.

Figure 11:
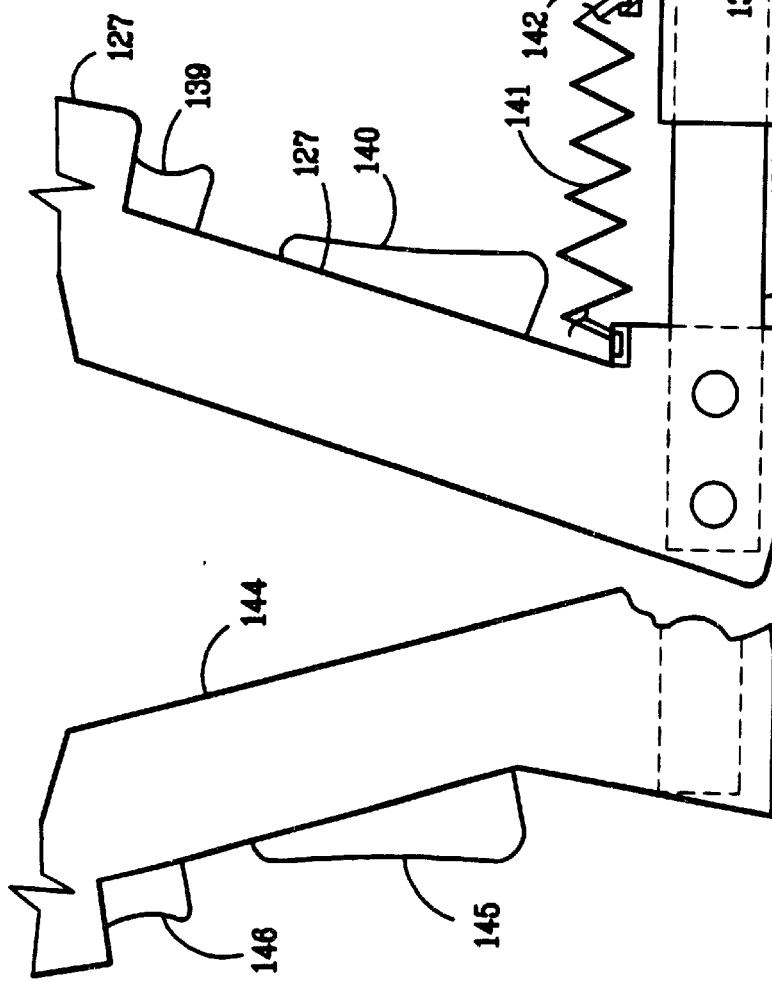
FIG. 11 is another embodiment of the present invention showing an alternative location of the operator's handgrip.

A variation of the handgrip configuration is depicted in FIG. 11, in which a handgrip 144 is like that of handgrip 127, but is disposed in a reversed position from that shown in FIG. 10. Such a configuration may be employed in a variety of applications, and is especially suited for use on cranes having a telescoping boom, as for example as shown in FIG. 9. The configuration in FIG. 11 would utilize most of the same components as described for the control 10e in FIG. 10, with only changes in handgrip 144.

Preferably, for configurations employing handgrip 144, the operator of a crane would be facing left as oriented in FIG. 11, as compared with facing right in FIG. 10 for an aerial platform that employs handgrip 127. With respect to employing handgrip 144, it can be easily understood that the operator's forearm would be above and close to cover 121 (of FIG. 10) as a natural location to have the crane boom motions analogous to the motions of the control in FIG. 11. Moving the control left would cause the crane boom to rotate left as seen by the operator; lifting handgrip 144 upward would cause the boom of the crane to move upward; and pulling the handgrip toward the operator would cause the crane boom to be retracted. With the operator's forearm above the control it can easily be seen that the cover of the control could logically become an armrest and serve to steady the operator's hand for smooth operation.

According to another aspect of the present invention, the control system according to any of the embodiments described herein may be coupled with logic that prevents activation of, or locks out, a primary power supply while any of the switches of the control system are activated. This lock out feature prevents inadvertent movement of the aerial work platform upon initial start-up of the machine main power system.

Figure 12D:
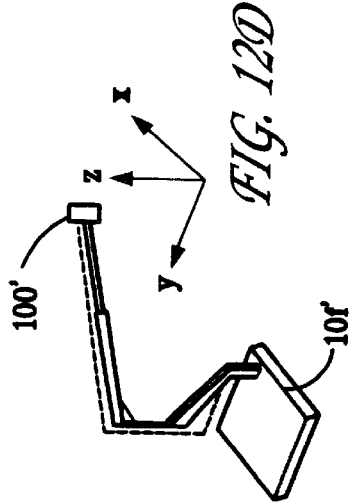
FIGS. 12A through 12F illustrate machine configurations on which the control system of the present invention may be employed.
Figure 12E:
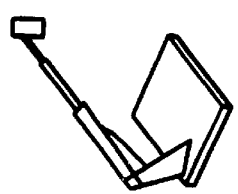
Figure 12F:
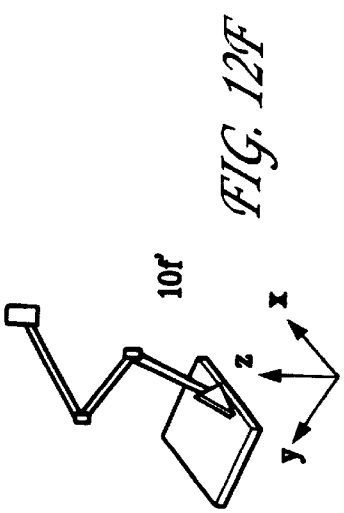
Figure 12A:
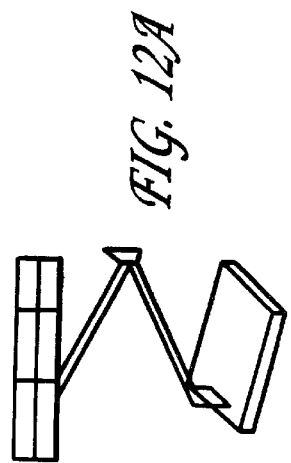
Figure 12B:
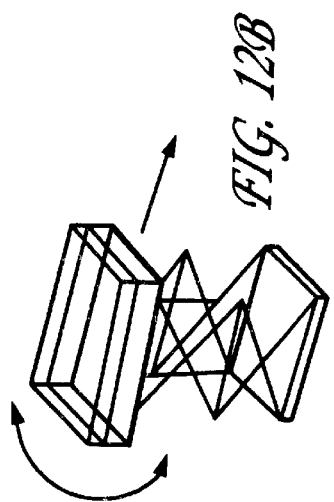
Figure 12C:
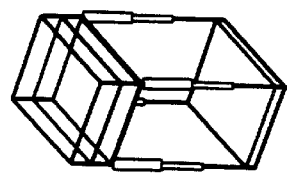

The present invention has been illustrated by describing particular examples. However, the present invention is not limited thereto, but rather encompasses numerous variations that will be apparent to persons familiar with the general types of mobile machines referred to herein in light of the present disclosure. For example, referring to FIGS. 12A through 12F, the control according to the broad principles described herein may be employed for use on an aerial work platform or any type of machine having any combination of articulating joints, telescoping booms, vertical lifts, and the like. As shown in FIGS. 12A, 12B, and 12C, the present invention may be employed with machines having an operator platform that does not entirely extend beyond its platform above which it is raised. In FIG. 12B, the dashed arrows indicate that the platform is rotatable on its base, and either a portion of the operator platform is horizontally extendable or the entire base platform is translatable. FIG. 12C shows a platform on four extendable booms. FIG. 12D shows a pair of articulating joints and a telescoping boom. FIG. 12E shows a single articulating joint and a telescoping boom. FIG. 12F shows arms having three articulating joints. On each of the distal ends of the machines shown in FIGS. 12D, 12E, and 12F, an operator bucket is disposed. It is understood that each of the machines shown in FIGS. 12A through 12F include power systems, cylinders, and the like to make them operational, and the platforms shown may be stationary, mounted on a truck or other movable chassis. Each may be rotatable according to the particular application.

The present invention is illustrated by reference to the analog control disclosed herein. The present invention, is not limited thereto, but rather encompasses an analog control employed on aerial work platforms having booms with two or more telescoping sections, two or more articulating sections, and/or or some combination thereof. For example, the analog control 10a shown in FIG. 1 may be employed on, for example, a boom having a telescoping boom with three or more nested booms, or may be employed on, for example, a system having more than one articulating joint. Even though the analog control 10a would not be a model of the aerial work platform on which it is mounted, the operator would benefit from the intuitive recognition and comprehension of the operation of the machine.

In this regard, a control according to the present invention may be disposed on any of the configurations shown schematically in FIGS. 12A through 12F. For the configurations shown in FIGS. 12A, 12B, and 12E, the control may be as described with any of the embodiments of control 10a, 10b, 10c, or 10e. Movement of the handgrip of the control system in an up and down direction may impart corresponding up and down motion of the operator platform. Similarly, pivoting of the handgrip may impart corresponding rotating of the platform, and moving the handgrip in and out may produce forward and backward motion of the platform, according to the particular configuration thereof. Any of these motions, especially the forward and backward motion, may be interlocked with any of the safety switches. Further, the handgrip may be employed to steer the machine, as described in the co-pending U.S. patent application Ser. No. 08/672,427, now U.S. Pat. No. 6,170,606.

The control embodiments 10a, 10b, 10c, or 10e may also be employed to operate any of the machines shown schematically in FIGS. 12D and 12E. The up and down and extending and retracting motion imparted to the handgrip may impart corresponding motion to the articulating portion(s) and telescoping portion(s) of the machines shown in FIGS. 12D and 12E.

In the embodiments described above, the control system motion imparts the corresponding motion to the machine. For example, if the operator extends the boom of control 10*a*, the boom of the aerial platform extends in response, regardless of the angular position of the boom. The operator easily comprehends such movements of this type of simple and intuitive control. In this regard, the operator has a view and easy understanding of the articulating and telescoping mechanisms of both the machine and the corresponding mechanisms of the control. Movement of the articulating portion of the control causes motion of the articulating portion of the machine. Movement of the telescoping portion of the control causes motion of the telescoping portion of the machine. And, movement of the pivoting portion of the control causes motion of the rotating portion of the machine.

The present invention also encompasses additional logic controls such that movement of the control handgrip in three dimensional coordinates imparts identical motion of the machine in the three dimensional coordinate system. Such a control, for which any of the control embodiments 10*a*, 10*b*, 10*c*, or 10*e* may be employed, may be useful to operate the machine configuration shown in FIG. 12F, thereby illustrating another aspect of the present invention. Because the controls described herein provide an integrated control that encloses three directional controls, the operator is enabled to control the positioning of the bucket, operator platform, crane end, or other desired machine component with only the movement of one handgrip.

Specifically, referring to FIGS. 12D and 12F to employ a coordinate axis, the control according to the present invention encompasses a control for providing signals for translating the aerial platform (which encompasses an operator platform, bucket, crane end, and the like) in the z-direction, translating the aerial platform in the y-direction, and rotating the aerial platform about the z-axis. The up and down switches provide an indication that the operator desires the machine to be raised or lowered (that is, moved in the z-direction, the in and out switches (or telescoping mechanism switches) provide an indication that the operator desires the machine to extend or retract the aerial platform inwardly or outwardly (that is, in the y-direction), and switches on the pivoting portion of the control provide an indication that the operator desires the machine to so rotate about the z-axis. Furthermore, any combination of the motions may be simultaneously activated to provide composite motion. Thus, the control may employ additional logic controls to facilitate such movement.

For example, for the configuration shown in FIG. 12D, if the operator bucket is already partially extended to a first work position, and the operator desires to move the operator bucket to a second work position that is in the same horizontal plane as the first work position, the operator may require several small movements to position that bucket. A control 10*a* is indicated as mounted on a control station on the bucket, although any of the controls described herein may be employed. Specifically, if the operator extends the boom of the control, the boom of the machine will extend, which will not only move the bucket in the x-y plane, but will also raise the bucket in the z-direction because of the inclined orientation of the boom. A logic controller, shown schematically as 10*f* in FIG. 12D, may include logic controls such that movement of the control 10*a* in and out provides only horizontal motion to the bucket. Such motion would require the cylinders actuating the articulating joints to retract while the telescoping portion extends so as to cancel each other's motions in the z-direction but to provide a net motion in the direction imparted to the handgrip in the x-y plane. Such logic would also incorporate motion of the turntable such that moving the handgrip from side to side would result in motion only in the x-y plane and not in the z direction. Similarly, raising the handgrip would impart motion only in the z-direction and not in the x-y plane, which again, would require coordination of the cylinders and telescoping mechanisms.

The configuration shown in FIG. 12F may benefit from such a logic control system, because it lacks a telescoping mechanism, and therefore the operator of such a machine would lack the benefit of the visual recognition. Thus, employing the logic described above, the operator may obtain the benefit of understanding and comprehending the motion of the machine in a three dimensional coordinate system. Such a logic control system may employ conventional feedback and logic systems, and may include programmable logic or other types of software, as will be apparent to persons familiar with such logic for like industrial applications, and the corresponding hardware suitable for implementing such logic.

The present invention also encompasses numerous other features that will be apparent to persons familiar with such controls. For example, each of the control systems described herein may include detents or other means to require the force for initial movement of the control from neutral to be greater than the force required to hold the control in a position which causes movement of the platform, thereby reducing the likelihood of inadvertent motion of the control in functions other than the functions being intentionally operated by the operator.

I claim:

1. A mobile machine comprising an aerial work platform, said aerial work platform system comprising:

a chassis, elevating mechanisms, a platform capable of carrying an operator; and a control device, mounted on the operator's platform, for effecting motion of said aerial work platform, said control device including:

a fixed portion that is secured to the operator platform;

a first pivotable portion, the pivotable portion being pivotable on the fixed portion and being urgeable clockwise or counterclockwise relative thereto;

a control boom including a control inner boom that is inwardly and outwardly urgeable along a longitudinal axis of said control boom to impart corresponding movement of a portion of the elevating mechanisms, the control boom having a first end and a second end that is pivotably coupled to the first pivotable portion;

a handle being coupled to the first end of the control boom;

at least one first switch system, a portion of the first switch system being disposed on a moveable portion of the pivotable portion, the first switch system being activated by the motion of the pivotable portion upon urging by the operator, and at least one second switch system being disposed on a moveable portion of the control boom, a third switch system being disposed on a portion of the control boom, the second switch system and the third switch system being activated by the motion of the control boom upon urging by the operator, said first, second, and third switch systems enabling signals whereby the aerial work platform may be controlled;

whereby a portion of the control device enhances comprehension of the operation of the aerial work platform by the operator.

2. The control of claim 1 wherein said control device includes a control outer boom movably coupled to the control inner boom such that said control inner boom is capable of telescoping relative to said control outer boom, said at least one switch being positioned proximate said control inner boom to provide a signal.

3. The mobile machine of claim 2 wherein the mobile machine includes a telescoping boom, the control boom providing a simulated version of the work platform telescoping boom.

4. The mobile machine of claim 2 wherein each one of the first and second pivotable portions and the inner boom simulate elements of the aerial work platform, whereby the mobile machine undergoes motions that correspond to movements imparted to said control by the operator, whereby recognition and comprehension by the operator are expedited and enhanced.

5. The mobile machine of claim 2 wherein said control boom is a simulated boom of a mobile machine boom such at extending the simulated boom imparts a signal for extending the mobile machine boom and retracting the simulated boom imparts a signal for retracting the mobile machine boom.

6. The mobile machine of claim 1 further comprising a second pivotable portion, the second pivotable portion being supported by the first pivotable portion, the control boom second end being coupled to the first pivotable portion.

7. The mobile machine of claim 6 wherein the mobile machine includes an articulating joint, the control device including a control articulating device that simulates the articulating joint of the mobile machine.

8. The mobile machine of claim 6 wherein the aerial work platform includes a rotatable turntable, the first pivotable portion simulating the aerial work platform rotatable turntable.

9. The mobile machine of claim 1 wherein the first pivotable portion, the second pivotable portion, and the control boom of the control device are disposed within a single housing, whereby the control forms a single unit.

10. The mobile machine of claim 1 wherein said control device comprises a third switch system that is disposed at least partly on a second pivotable portion, said third switch system being activated by the motion of the second pivotable portion upon urging by the operator.

11. The aerial work platform of claim 10 wherein the third switch system includes a pair of switches and an actuating member, one of the actuating member and the third switches being coupled to the second pivotable portion, the other one of the actuating member and the third switches being coupled to the fixed base, such that the actuating member moves relative to the third switches upon pivoting of the second pivotable portion, whereby the actuating member actuates one of the third switches upon pivoting of the second pivotable member in a clockwise direction and actuates the other one of the third switches upon pivoting of the second pivotable member in a counterclockwise direction.

12. The mobile machine of claim 10 further comprising a boom-supported elevating work platform which is attached to and transported by an integral chassis.

13. The mobile machine of claim 10 wherein said aerial work platform is a manually propelled elevating work platform attached to and transported by a manually propelled chassis and includes means for elevating the platform vertically but not completely outside the base of said aerial platform.

14. The mobile machine of claim 10 wherein said aerial work platform is an airline ground support vehicle-mounted vertical lift device and means for elevating the platform of said mobile machine.

15. The mobile machine of claim 10 wherein said aerial work platform is a vehicle mounted bridge inspection and maintenance device and includes means for elevating the aerial work platform.

16. The mobile machine of claim 1 wherein said aerial work platform is a self-propelled elevating work platform having means for elevating the work platform vertically but not completely outside the base of said work platform.

17. The mobile machine of claim 1 wherein said aerial work platform is a vehicle-mounted elevating and rotating aerial device.

18. The mobile machine of claim 1 wherein said control device is oriented so that the operator can operate all of the motions provided while facing away from said control to observe any object that is approaching as well as a desired end destination of the operator's platform.

19. A mobile machine having a chassis and a power system for providing power to components of the mobile machine, comprising:
a main boom mounted on a rotatable turntable at a pivotable joint, said main boom capable of telescoping inwardly and outwardly, elevating about the pivotable joint, and rotating on the chassis; and
a control device, mounted on an operator platform that is coupled to the chassis, for effecting motion of said boom, said control device including:
a fixed portion that is secured to the operator platform;
a first pivotable portion, the pivotable portion being pivotable on the fixed portion and being clockwise and counterclockwise urgeable relative thereto so as to provide a signal for corresponding clockwise and counterclockwise rotation of the rotating turntable;
a second pivotable portion coupled to the first pivotable portion, said second pivotable portion being upwardly and downwardly pivotable relative to the first pivotable portion so as to provide a signal for corresponding upward and downward movement of the main boom about the pivotable joint;
a control boom including a control inner boom that is inwardly and outwardly urgeable along a longitudinal axis of said control boom so as to provide a signal for corresponding inward and outward telescoping of the main boom, the control boom having a first end and a second end that is coupled to the pivotable portion; and
a handle being coupled to the first end of the control boom for imparting motion thereto by an operator,
wherein said control device comprises a first switch system, a portion of the first switch system being disposed on a moveable portion of the first pivotable portion, the first switch system being activated by the motion of the first pivotable portion upon urging by the operator, a second switch system being disposed on a moveable portion of the control boom, the second switch system being activated by the motion of the control boom upon urging by the operator, a third switch system being disposed at least panty on the second pivotable portion, said first, second, and third switch systems enabling signals whereby the mobile machine may be controlled.

20. The mobile machine of claim 19 further comprising a linkage coupling a support of the control device to the main boom such that a movement of the main boom about the pivotable joint moves the control device in a corresponding direction.

21. The mobile machine of claim 20 wherein movement of the control device in a clockwise direction moves the main boom in a clockwise direction and movement of the control device in a counterclockwise direction moves the main boom in a counterclockwise direction.

22. The mobile machine of claim 19 further comprising a jib boom disposed at a distal end of the main boom, said control device including a simulated jib boom disposed at a distal end of the control boom, whereby the recognition of the structure of the main boom and jib boom is enhanced and comprehension of the function of the control device is enhanced.

23. The mobile machine of claim 22 wherein a block is linked to the handle, slidably coupled to the control boom, and linked to the simulated jib boom so that said simulated jib boom moves downward at the same time that the operator moves the control to cause the machine's jib boom to be lowered and moves upward when the operator moves the control to cause the machine's jib boom to be raised.

24. The mobile machine of claim 19 wherein said control device is disposed at the operator platform, the control device having each one of its pivotable portions disposed at an end proximate the operator, thereby enhancing recognition and comprehension by the operator.

25. The mobile machine of claim 19 wherein the mobile machine is a mobile vehicle-mountable crane.

26. The mobile machine of claim 19 wherein the mobile machine is a telescoping boom material handler.

27. The mobile machine of claim 19 wherein the mobile machine is a telescoping boom grader.

28. The mobile machine of claim 19 wherein the mobile machine is a backhoe.

29. The mobile machine of claim 19 wherein the mobile machine is an excavator.

30. A control system for providing signals in response to an operator's input, said control system comprising:
 a base;
 a control member extending outwardly from the base and coupled thereto, the control member defining a control member longitudinal axis;
 a handgrip coupled to the control member, the handgrip being:
  urgeable inwardly and outwardly relative to the base along the control member longitudinal axis,
  urgeable clockwise and counterclockwise relative to the base, and
  urgeable upwardly and downwardly relative to the control member longitudinal axis; and
 a first switch coupled to the base and disposed to actuate in response to the inwardly and outwardly urging of the handgrip to enable a corresponding inward or outward control signal;
 a second switch coupled to the base and disposed to actuate in response to the clockwise and counterclockwise urging of the handgrip to enable a corresponding clockwise or counterclockwise signal; and
 a third switch coupled to the base and disposed to actuate in response to the upward and downward urging of the handgrip.

31. The control system of claim 30 wherein said control member includes one or more articulating sections.

32. The control system of claim 30 wherein the handgrip is coupled to an end of the control member that is opposite the base.

33. The control system of claim 30 wherein the handgrip is spaced apart from ends of the control member.

34. The control system of claim 30 wherein the control member is a boom that extends substantially horizontally from the base.

35. The control system of claim 30 wherein the base includes a first pivotable portion that pivots on a spindle that is disposed on a substantially vertical axis in response to clockwise or counterclockwise urging of the handle the spindle being fixed to the base.

36. The control system of claim 35 wherein the base further includes a second pivotable portion that is disposed on the first pivotable portion, the second pivotable portion pivoting in response to upwardly or downwardly urging of the handgrip.

37. The control system of claim 36 wherein the second pivotable portion pivots about a pin that is disposed on a substantially horizontal axis.

38. The control system of claim 36 wherein the control member includes a slideable telescoping portion.

39. The control system of claim 38 wherein the telescoping portion includes an inner boom that is coupled to the handgrip and an outer boom portion that is coupled to the first pivotable portion.

40. The control system of claim 39 wherein the inner boom has a pair of slots formed on opposing sides thereof, a bolt extends from the outer boom through the slots, each slot having a length sufficient to enable a desired length of telescoping motion, the length of telescoping motion being limited by the bolts within the slots.

41. The control system of claim 39 further comprising a compression spring and a pair of opposing blocks being disposed inside said inner boom at opposing ends therefor, each of said blocks having a block slot adequate to permit a corresponding bolt to move into the block slot, said compression spring being disposed inside said inner boom such that it is compressed by one of said slotted blocks as the inner boom is telescoped in and is compressed by the other said slotted block as the inner boom is telescoped out whereby the single compression spring serves to return said inner boom and the attached handgrip to the neutral position from either the telescope-in position or the telescope-out position.

42. The control system of claim 39 wherein a hinged end of the outer boom fits within and is attached to a boom fitting that includes flanges extending downward into the first pivotable portion, said flanges having means for operating a lift-up switch and a lift-down switch mounted on adjacent ribs of said first pivotable portion, said boom fitting having stops that contact matching stops on said ribs of the first pivotable portion, thereby limiting both upward motion and downward motion of said control handgrip.

43. The control system of claim 38 wherein the first pivotable portion, the second pivotable portion, and the telescoping portion are mechanically coupled together within a single housing.

44. The control system of claim 43 wherein the housing is open to enable visual access to at least the telescoping portion, whereby recognition and comprehension of the control is enhanced.

45. The control system of claim 38 further comprising detents to require the force for initial movement of the control from a neutral position to be greater than the force required to hold the control in a position which causes movement of the platform, thereby reducing the likelihood of inadvertent motion of the control in functions other than the functions being intentionally operated by the operator.

46. The control system of claim 30 further comprising springs that urge the handgrip to its neutral position when said handgrip is released.

47. The control system of claim 30 wherein at least one of the first switch, the second switch, and the third switch is a controller switch that yields an output that is proportional to either the speed or force applied to or displacement of the handgrip.

48. The control system of claim 30 wherein each one of the first switch, the second switch, and the third switch is a bi-directional sensor, each one of the bi-directional sensors providing an output signal in response to displacement imparted to the handgrip.

49. The control system of claim 30 further comprising a safety switch disposed in the handgrip, thereby providing an interlock such that said control system is operative only while said safety switch is depressed.

50. The control system of claim 49 further comprising a trigger disposed on the handgrip, the trigger being coupled to a portion of a potentiometer and a second safety switch.

51. The control system of claim 49 further comprising a power supply lockout to prevent activation of a primary power supply unless said control system is locked in a neutral position.

52. The control system of claim 49 further comprising mechanical means to lock said control system in a neutral position unless said safety switch is operated.

53. The control system of claim 49 further comprising electrical means to lock said control in a neutral position unless said safety switch is operated.

54. The control system of claim 30 wherein said control system is oriented so that the operator can operate all of the motions provided while facing away from said control to observe any object that is approaching and a desired end destination.

* * * * *